(12) United States Patent
McWaid et al.

(10) Patent No.: US 12,540,405 B2
(45) Date of Patent: *Feb. 3, 2026

(54) ANODE AND/OR CATHODE PAN ASSEMBLIES IN AN ELECTROCHEMICAL CELL, AND METHODS TO USE AND MANUFACTURE THEREOF

(71) Applicant: Verdagy, Inc., Moss Landing, CA (US)

(72) Inventors: Thomas H. McWaid, Santa Cruz, CA (US); Ryan J. Gilliam, San Jose, CA (US)

(73) Assignee: Verdagy, Inc., Moss Landing, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,348

(22) Filed: Sep. 13, 2023

(65) Prior Publication Data

US 2024/0055636 A1 Feb. 15, 2024

Related U.S. Application Data

(63) Continuation of application No. 17/813,214, filed on Jul. 18, 2022, now Pat. No. 11,799,110, which is a continuation of application No. 17/557,421, filed on Dec. 21, 2021, now Pat. No. 11,444,304.

(60) Provisional application No. 63/195,520, filed on Jun. 1, 2021.

(51) Int. Cl.
| | |
|---|---|
| *C25B 1/04* | (2021.01) |
| *C25B 9/13* | (2021.01) |
| *C25B 9/60* | (2021.01) |
| *C25B 15/08* | (2006.01) |

(52) U.S. Cl.
CPC .............. *C25B 1/04* (2013.01); *C25B 9/13* (2021.01); *C25B 9/60* (2021.01); *C25B 15/08* (2013.01)

(58) Field of Classification Search
USPC ....................................... 204/278.5
See application file for complete search history.

(56) References Cited

U.S. PATENT DOCUMENTS

| | | |
|---|---|---|
| 5,571,390 A | 11/1996 | Kimura et al. |
| 6,761,808 B1 | 7/2004 | Revill et al. |
| 6,773,561 B1 | 8/2004 | Noaki et al. |
| 7,175,745 B2 | 2/2007 | Fujita |
| 7,323,090 B2 | 1/2008 | Houda et al. |
| 7,381,313 B2 | 6/2008 | Libby et al. |

(Continued)

FOREIGN PATENT DOCUMENTS

| | | |
|---|---|---|
| CN | 110219012 | 9/2019 |
| CN | 117651790 | 3/2024 |

(Continued)

OTHER PUBLICATIONS

"U.S. Appl. No. 17/557,421, Restriction Requirement mailed Mar. 8, 2022", 7 pgs.

(Continued)

*Primary Examiner* — Harry D Wilkins, III
(74) *Attorney, Agent, or Firm* — Schwegman Lundberg & Woessner, P.A.

(57) ABSTRACT

Provided herein are anode and/or cathode pan assemblies comprising unique manifold, outlet tube, and/or baffle plate configurations; electrochemical cell and/or electrolyzer containing the anode and/or the cathode pan assemblies; and methods to use and manufacture the same.

22 Claims, 10 Drawing Sheets

(56) References Cited

U.S. PATENT DOCUMENTS

| | | | |
|---|---|---|---|
| 8,636,880 | B2 | 1/2014 | Stolberg |
| 9,340,882 | B2 | 5/2016 | Tampucci et al. |
| 9,683,300 | B2 | 6/2017 | Noaki et al. |
| 10,407,781 | B2 | 9/2019 | Domon et al. |
| 10,883,181 | B2 | 1/2021 | Takanami et al. |
| 10,968,526 | B2 | 4/2021 | Iacopetti et al. |
| 11,444,304 | B1* | 9/2022 | McWaid .................. C25B 9/19 |
| 11,799,110 | B2* | 10/2023 | McWaid .................. C25B 1/04 |
| 2004/0108204 | A1 | 6/2004 | Revill et al. |
| 2005/0029116 | A1 | 2/2005 | Bulan et al. |
| 2012/0196202 | A1 | 8/2012 | Mcinerney et al. |
| 2017/0342576 | A1 | 11/2017 | Mcwaid et al. |
| 2018/0105942 | A1 | 4/2018 | Shannon et al. |
| 2018/0148848 | A1 | 5/2018 | Shannon et al. |
| 2022/0384829 | A1 | 12/2022 | Mcwaid et al. |

FOREIGN PATENT DOCUMENTS

| | | |
|---|---|---|
| JP | H05320970 | 12/1993 |
| JP | 2001064793 | 3/2001 |
| JP | 2004225148 | 8/2004 |
| JP | 3707778 | 8/2005 |
| JP | 2006503985 | 2/2006 |
| JP | 2006528730 | 12/2006 |
| JP | 2013204130 | 10/2013 |
| JP | 2018513276 | 5/2018 |
| JP | 2021063267 | 4/2021 |
| JP | 2024523808 | 7/2024 |
| WO | 2022256042 | 12/2022 |

OTHER PUBLICATIONS

"U.S. Appl. No. 17/557,421, Response filed Mar. 15, 2022 to Restriction Requirement mailed Mar. 8, 2022", 7 pgs.
"International Application Serial No. PCT US2021 065004, Invitation to Pay Additional Fees mailed Mar. 4, 2022", 2 pgs.
"U.S. Appl. No. 17/557,421, Non Final Office Action mailed Apr. 15, 2022", 8 pgs.
"International Application Serial No. PCT US2021 065004, International Search Report mailed May 26, 2022", 5 pgs.
"International Application Serial No. PCT US2021 065004, Written Opinion mailed May 26, 2022", 8 pgs.
"U.S. Appl. No. 17/557,421, Response filed May 31, 2022 to Non Final Office Action mailed Apr. 15, 2022", 11 pgs.
"U.S. Appl. No. 17/557,421, Notice of Allowance mailed Jun. 8, 2022", 5 pgs.
"U.S. Appl. No. 17/813,214, Non Final Office Action mailed Nov. 1, 2022", 13 pgs.
"U.S. Appl. No. 17/813,214, Response filed Feb. 1, 2023 to Non Final Office Action mailed Nov. 1, 2022", 16 pgs.
"U.S. Appl. No. 17/813,214, Final Office Action mailed Feb. 13, 2023", 11 pgs.
"U.S. Appl. No. 17/813,214, Response filed Apr. 24, 2023 to Final Office Action mailed Feb. 13, 2023", 17 pgs.
"U.S. Appl. No. 17/813,214, Advisory Action mailed May 4, 2023", 3 pgs.
"U.S. Appl. No. 17/813,214, Notice of Allowance mailed Jun. 14, 2023", 9 pgs.
"U.S. Appl. No. 17/813,214, Corrected Notice of Allowability mailed Jun. 28, 2023", 3 pgs.
"U.S. Appl. No. 18/466,348, Preliminary Amendment Filed Nov. 2, 2023", 5 pgs.
"International Application Serial No. PCT US2021 065004, International Preliminary Report on Patentability mailed Dec. 14, 2023", 10 pgs.
Mandhane, J M, "A flow pattern map for gas-liquid flow in horizontal pipes", International Journal of Multiphase Flow, (1974), 537-553.
"Japanese Application Serial No. 2023-574156, Voluntary Amendment filed Jan. 29, 2024", with English claims, 13 pages.
"Australian Application Serial No. 2021448957, First Examination Report mailed Nov. 11, 2024", 4 pages.
"Japanese Application Serial No. 2023-574156, Notification of Reasons for Refusal mailed Feb. 26, 2025", with English translation, 18 pages.
"Japanese Application Serial No. 2023-574156, Response filed May 2, 2025 to Notification of Reasons for Refusal mailed Feb. 26, 2025", with English claims, 10 pages.
"Australian Application Serial No. 2021448957, Response filed May 6, 2025 to First Examination Report mailed Nov. 11, 2024", 16 pages.
Australian Application Serial No. 2021448957, Subsequent Examination Report mailed May 16, 2025, 6 pages.
"European Application Serial No. 21944400.7, Extended European Search Report mailed Jul. 29, 2025", 9 pages.

\* cited by examiner

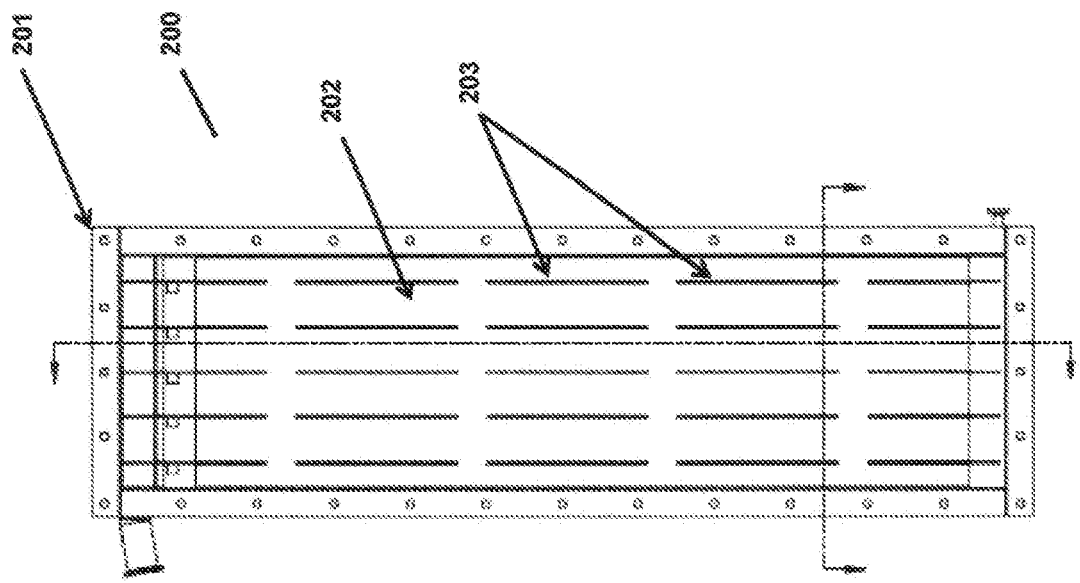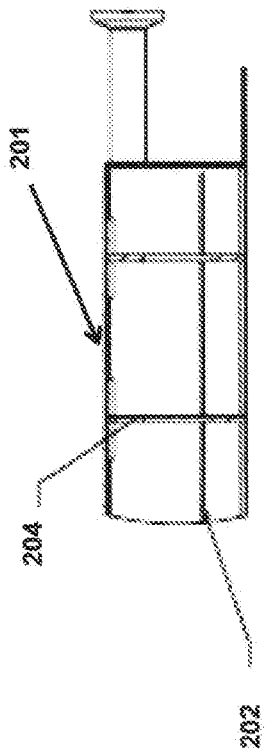
FIGURE 5

ANODE AND/OR CATHODE PAN ASSEMBLIES IN AN ELECTROCHEMICAL CELL, AND METHODS TO USE AND MANUFACTURE THEREOF

CROSS-REFERENCE TO RELATED APPLICATIONS

This application claims benefit of U.S. Provisional Application No. 63/195,520, filed Jun. 1, 2021, which is incorporated herein by reference in its entirety in the present disclosure.

BACKGROUND

Production of hydrogen plays a key role in any industrialized society, since hydrogen is required for many essential chemical processes. As of 2019, roughly 70 million tons of hydrogen may have been produced annually worldwide for various uses, such as oil refining, and in the production of ammonia (through the Haber process) and methanol (through reduction of carbon monoxide), and also as a fuel in transportation.

A majority of hydrogen (~95%) may be produced from fossil fuels by steam reforming of natural gas, partial oxidation of methane, and coal gasification. Other methods of hydrogen production include biomass gasification, no $CO_2$ emissions methane pyrolysis, and electrolysis of water. Electrolysis consists of using electricity to split water into hydrogen and oxygen. All methods and systems are, however, generally more expensive than fossil-fuel based production methods and the fossil-fuel based methods are environmentally damaging. Therefore, there is a need for a cost competitive and an environmentally friendly hydrogen gas producing electrolysis system.

SUMMARY

Provided herein are methods and systems that relate to anode pan assembly and/or cathode pan assembly configurations used in electrochemical cells designed to carry out electrolysis processes, such as, e.g. hydrogen gas production in an ion exchange membrane (IEM) water electrolysis technology that may enable commercially compelling alternative to fossil fuels. The anode pan assembly and/or cathode pan assembly configurations provided herein include unique manifold, outlet tube, and/or baffle plate configurations that enable operation of the electrochemical cells at high current densities. Due to production at high current densities, a targeted production rate may be met with fewer cells, thereby reducing capital expenses and making electrolysis system a viable source for hydrogen gas production.

In one aspect, there is provided an anode and/or a cathode pan assembly, comprising: an anode and/or a cathode pan, and a manifold positioned inside the anode and/or the cathode pan, wherein cross sectional area of the manifold comprises depth of the manifold to be between about 0.25-0.75 of depth of the pan. In some embodiments of the foregoing aspect, the cross sectional area of the manifold is between about 520-6200 $mm^2$. In some embodiments of the foregoing aspect and embodiment, the anode and/or the cathode pan assembly further comprises an outlet tube fluidly connected to the manifold. In some embodiments of the foregoing aspect and embodiments, an equivalent diameter of the outlet tube is between about 26-89 mm.

In one aspect, there is provided an anode and/or a cathode pan assembly, comprising: an anode and/or a cathode pan; one or more ribs inside the pan comprising one or more notches; and a baffle plate comprising two or more slots configured to fit over the one or more notches of the one or more ribs.

In one aspect, there is provided an anode and/or a cathode pan assembly, comprising: an anode and/or a cathode pan; a manifold positioned inside the anode and/or the cathode pan, wherein cross sectional area of the manifold comprises depth of the manifold to be between about 0.25-0.75 of depth of the pan; one or more ribs inside the pan comprising one or more notches, and a baffle plate comprising two or more slots configured to fit over the one or more notches of the one or more ribs.

In some embodiments of the foregoing aspects, the baffle plate is perpendicular to the one or more ribs. In some embodiments of the foregoing aspects and embodiments, the baffle plate is suspended between the electrode and the anode and/or the cathode pan or pan floor. In some embodiments of the foregoing aspects and embodiments, the baffle plate is parallel to the anode and/or the cathode pan.

In some embodiments of the foregoing aspects and embodiments, the width of the two or more slots in the baffle plate is equal to width of the one or more ribs so that the two or more slots fit over the one or more notches of the one or more ribs. In some embodiments of the foregoing aspects and embodiments, the distance between the two or more slots is equal to length of the one or more notches so that the two or more slots fit over the one or more notches of the one or more ribs. In some embodiments of the foregoing aspects and embodiments, the distance between two or more slots and/or the length of the one or more notches is between about 5-100 mm.

In some embodiments of the foregoing aspects and embodiments, the anode and/or the cathode pan assembly further comprises an electrode attached to top of the one or more ribs and the anode and/or the cathode pan.

In some embodiments of the foregoing aspects and embodiments, the distance of the baffle plate from the electrode is between about 5-15 mm. In some embodiments of the foregoing aspects and embodiments, the placement of the baffle plate is at between about 0.25-0.5 depth of the anode and/or the cathode pan. In some embodiments of the foregoing aspects and embodiments, the baffle plate leaves space at the top and/or bottom between the baffle plate and the anode and/or the cathode pan, for gas and liquid flow. In some embodiments of the foregoing aspects and embodiments, the space between the baffle plate and bottom of the anode and/or the cathode pan is between about 6-75 mm and/or the space between the baffle plate and top of the anode and/or the cathode pan and/or the manifold is between about 6-150 mm.

In some embodiments of the foregoing aspects and embodiments, the anode and/or the cathode pan assembly comprises a high flow rate of anolyte or catholyte, respectively, of between about 200-10,000 kg/h. In some embodiments of the foregoing aspects and embodiments, the anode and/or the cathode pan assembly is inside an electrochemical cell running at high current densities of between about 300 $mA/cm^2$-6000 $mA/cm^2$. In some embodiments of the foregoing aspects and embodiments, the cross sectional area of the manifold, the outlet tube and/or the baffle plate ensure superficial liquid velocity of anolyte and/or catholyte to be less than 0.1 m/s.

In some embodiments of the foregoing aspects and embodiments, the cross sectional area of the manifold, the outlet tube and/or the baffle plate accommodate high flow rate of anolyte or catholyte and/or gas preventing slug or plug flow. In some embodiments of the foregoing aspects and embodiments, the cross sectional area of the manifold, the outlet tube and/or the baffle plate prevent pressure fluctuations due to multiphase flow in the cell to less than 0.5 psi. In some embodiments of the foregoing aspects and embodiments, the cross sectional area of the manifold, the outlet tube and/or the baffle plate prevent membrane erosion and/or fatigue.

In some embodiments of the foregoing aspects and embodiments, the baffle plate partitions a volume inside the anode and/or the cathode pan to create a riser region between the baffle plate and the electrode that is rich in gas and to create a down-comer region between the baffle plate and floor of the pan that is rich in the electrolyte. In some embodiments of the foregoing aspects and embodiments, the electrode is an anode (in the anode pan assembly) and/or cathode (in the cathode pan assembly). In some embodiments of the foregoing aspects and embodiments, the baffle plate enables an electrolyte circulation and top to bottom mixing causing thermal equilibration of the inflowing electrolyte and preventing overheating of the cell.

In some embodiments of the foregoing aspects and embodiments, the anode and/or the cathode pan assembly is inside a hydrogen gas producing electrochemical cell. In some embodiments, the hydrogen is generated at the cathode and the oxygen is generated at the anode in the hydrogen gas producing electrochemical cell.

In some embodiments of the foregoing aspects and embodiments, the anode and/or the cathode pan assembly further comprises an electrolyte, such as an anolyte and/or a catholyte, respectively, wherein the anolyte and/or the catholyte comprise an alkaline solution.

In one aspect, there is provided an electrochemical cell, comprising: the anode and/or the cathode pan assembly of any of the aforementioned aspects and embodiments; an anode positioned on the anode pan assembly; a cathode positioned on the cathode pan assembly; and an ion exchange membrane disposed between the anode and the cathode. It is to be understood that in the electrochemical cell, either the aforementioned anode pan assembly (with a regular or conventional cathode assembly) or the aforementioned cathode pan assembly (with a regular or conventional anode assembly) or both the anode pan assembly and the cathode pan assembly may be present and as such all of those configurations are well within the scope of this disclosure.

In one aspect, there is provided an electrolyzer comprising multiplicity of individual aforementioned electrochemical cells.

In one aspect, there is provided a method, comprising: positioning a manifold inside an anode and/or a cathode pan of an electrochemical cell and fluidly connecting an outlet tube with the manifold thereby forming an anode and/or a cathode pan assembly, wherein cross sectional area of the manifold comprises depth of the manifold to be between about 0.25-0.75 of depth of the anode and/or the cathode pan. In some embodiments of the foregoing aspect, the method further comprises providing cross sectional area of the manifold to be between about 520-6200 mm². In some embodiments of the foregoing aspect and embodiments, the method further comprises providing an equivalent diameter of the outlet tube to be between about 26-89 mm.

In one aspect, there is provided a method, comprising positioning one or more ribs inside an anode and/or a cathode pan of an electrochemical cell wherein the one or more ribs comprise one or more notches; and placing a baffle plate over the one or more ribs wherein the baffle plate comprises two or more slots and fitting the two or more slots over the one or more notches of the one or more ribs.

In one aspect, there is provided a method, comprising
positioning a manifold inside an anode and/or a cathode pan of an electrochemical cell and fluidly connecting an outlet tube with the manifold, wherein cross sectional area of the manifold comprises depth of the manifold to be between about 0.25-0.75 of depth of the anode and/or the cathode pan;
positioning one or more ribs inside the anode and/or the cathode pan of the electrochemical cell wherein the one or more ribs comprise one or more notches; and
placing a baffle plate over the one or more ribs wherein the baffle plate comprises two or more slots and fitting the two or more slots over the one or more notches of the one or more ribs.

In some embodiments of the foregoing aspects and embodiments, the method further comprises placing the baffle plate perpendicularly to the one or more ribs. In some embodiments of the foregoing aspects and embodiments, the method further comprises attaching an electrode to top of the one or more ribs and the anode and/or the cathode pan. In some embodiments of the foregoing aspects and embodiments, the method further comprises suspending the baffle plate between the electrode and the anode and/or the cathode pan or the pan floor. In some embodiments of the foregoing aspects and embodiments, the method further comprises leaving space between the baffle plate and the top and/or bottom of the anode and/or the cathode pan for gas and liquid flow.

In some embodiments of the foregoing aspects and embodiments, the method further comprises operating the anode and/or the cathode pan assembly under a high flow rate of anolyte or catholyte, respectively, of between about 200-10,000 kg/h. In some embodiments of the foregoing aspects and embodiments, the method further comprises positioning the anode and/or the cathode pan assembly to assemble an electrochemical cell and running the electrochemical cell at high current densities of between about 300 mA/cm²-6000 mA/cm². In some embodiments of the foregoing aspects and embodiments, the electrochemical cell is hydrogen gas producing cell.

In some embodiments of the foregoing aspects and embodiments, the method further comprises ensuring superficial liquid velocity of anolyte and/or catholyte to be less than 0.1 m/s. In some embodiments of the foregoing aspects and embodiments, the method further comprises accommodating high flow rate of anolyte or catholyte and/or gas preventing slug or plug flow. In some embodiments of the foregoing aspects and embodiments, the method further comprises preventing pressure fluctuations due to multiphase flow in the cell to less than 0.5 psi. In some embodiments of the foregoing aspects and embodiments, the method further comprises preventing membrane erosion and/or fatigue.

In some embodiments of the foregoing aspects and embodiments, the method further comprises partitioning volume inside the anode and/or the cathode pan with the baffle plate and creating a riser region between the baffle plate and the electrode that is rich in gas and creating a down-comer region between the baffle plate and floor of the pan that is rich in the electrolyte.

In some embodiments of the foregoing aspects and embodiments, the method further comprises enabling an electrolyte circulation and top to bottom mixing with the baffle plate causing thermal equilibration of the inflowing electrolyte and preventing overheating of the cell.

In one aspect, there is provided a process for manufacturing an anode and/or a cathode pan assembly, comprising: attaching a manifold inside an anode and/or a cathode pan of an electrochemical cell and fluidly connecting an outlet tube with the manifold thereby forming an anode and/or a cathode pan assembly, wherein cross sectional area of the manifold comprises depth of the manifold to be between about 0.25-0.75 of depth of the anode and/or the cathode pan.

In one aspect, there is provided a process for manufacturing an anode and/or a cathode pan assembly, comprising attaching one or more ribs inside an anode and/or a cathode pan of an electrochemical cell wherein the one or more ribs comprise one or more notches; and placing a baffle plate over the one or more ribs wherein the baffle plate comprises two or more slots and fitting the two or more slots over the one or more notches of the one or more ribs.

In some embodiments of the foregoing aspect, the process comprising metallurgically attaching the manifold inside the anode and/or the cathode pan and/or metallurgically attaching the one or more ribs to the anode or the cathode pan and/or metallurgically attaching the baffle plate to the one or more ribs of the electrochemical cell.

In one aspect, there is provided a process for assembling an electrochemical cell, comprising:
- assembling an individual electrochemical cell by joining together the aforementioned anode pan assembly with a cathode assembly comprising a cathode pan and a cathode, and attaching an anode to the anode pan assembly to form an anode assembly; or
- assembling an individual electrochemical cell by joining together the aforementioned cathode pan assembly with an anode assembly comprising an anode pan and an anode, and attaching a cathode to the cathode pan assembly to form a cathode assembly; or
- assembling an individual electrochemical cell by joining together the aforementioned anode pan assembly and the aforementioned cathode pan assembly, and attaching an anode to the anode pan assembly to form an anode assembly and attaching a cathode to the cathode pan assembly to form a cathode assembly;
- placing the anode assembly and the cathode assembly in parallel and separating them by an ion-exchange membrane; and
- supplying the electrochemical cell with feeders for a cell current and an electrolysis feedstock.

In some embodiments of the aforementioned aspect, the electrochemical cell is hydrogen gas producing cell.

In one aspect, there is provided a process for assembling an electrolyzer, comprising: assembling aforementioned individual electrochemical cells; and placing a plurality of the assembled electrochemical cells side by side in a stack and bracing them together so as to sustain electrical contact between the electrochemical cells.

BRIEF DESCRIPTION OF THE DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings of which:

FIG. 5 illustrates some embodiments related to the anode pan assembly or the cathode pan assembly comprising the baffle plate fitted over the ribs and suspended in the anode pan or the cathode pan. The figure on the right illustrates a front view of the assembly and figure on the left illustrates a cross section view of the assembly.

DETAILED DESCRIPTION

Figure 1:
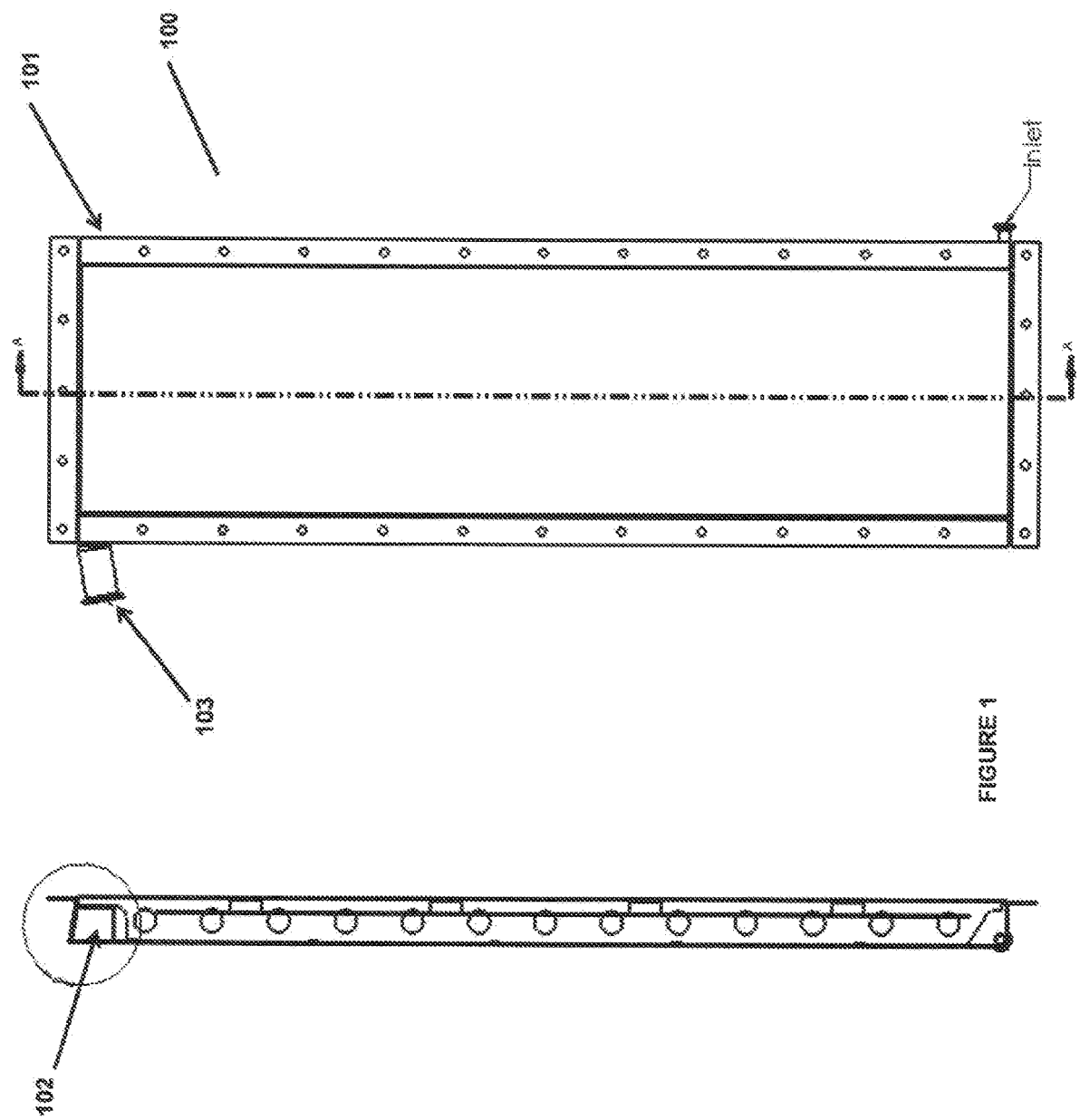
FIG. 1 illustrates some embodiments related to the anode pan assembly or the cathode pan assembly comprising a manifold and an outlet tube. The figure on the right illustrates a front view of the assembly and figure on the left illustrates a cross section view of the assembly.

Provided herein, are components, methods, and electrochemical cells that relate to the anode pan assembly and/or the cathode pan assembly comprising unique manifold and/or outlet tube and/or baffle plate configurations, designed to carry out electrolysis processes, such as e.g. hydrogen gas production at high current densities in IEM, such as e.g. anion exchange membrane (AEM) alkaline water electrolysis technology.

Typically, commercial alkaline water electrolysis cells may operate at 100-400 $mA/cm^2$. For example, commercial chlor-alkali electrochemical cells typically may operate at current densities of up to about 500 $mA/cm^2$. However, Applicants have designed unique electrochemical cells and its components that can dynamically operate at high current densities so that operators may meet their targeted production rate with fewer cells, thereby reducing capital expenses. Moreover, the cell's high range of operational current densities may provide operators with a large turndown ratio, enabling them to maximize production when power prices are low, and reduce power consumption when power prices are high.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges that are presented herein with numerical values may be construed as "about" numericals. The "about" is to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Anode and/or Cathode Pan Assembly

The operation of the electrochemical cells at high current densities, as stated earlier, can result in significant challenges, such as, but not limited to, accommodation of large gas volumes produced at high current densities, significant pressure fluctuations, membrane erosion or fatigue, large amount of heat generated in the cell, and/or high flow rates of the electrolytes. The unique configurations of the anode and/or cathode pan assemblies in the electrochemical cells provided herein can overcome one or more of these challenges, such as, but not limited to, avoid large temperature variations of the electrolyte along the height of the cell; avoid masking a significant fraction of the nominal active area with gas; avoid formation of a stagnant gas pocket that can result in localized drying out of the membrane; and/or avoid significant pressure fluctuations due to slug or plug flow at the cell outlets.

Due to the large gas volumes, static gas pockets can form on the electrode or at the top of the cell. In order to combat gas pockets, providing high electrolyte flow rates and utilizing features that cause gas lift to create high local shear rates, may help to minimize the static gas pockets that form on the electrode. However, the high electrolyte flow rates coupled with large production of gases and large amount of liquid entering and exiting the cell, present significant challenges associated with slug and plug flow. The operation at the high electrolyte flow rates and the high current densities can lead to slugging at the cell outlet which can be minimized by using the manifold and the outlet tube configurations provided herein.

Applicants provide herein an anode and/or cathode pan assembly that contains an effective collection system at the top of the cell to insure that large stagnant gas pockets either are not formed or are minimized at the top of the cell. The collection system comprises a manifold and an outlet tube with large cross-sectional area that effectively provides space for gas to collect as well as liquid to flow without masking the membrane and/or causing slug and plug flow. The anode and/or cathode pan assembly provided herein insures that this two phase (gas/liquid) flow gets effectively directed out of the cell.

The anode and/or cathode pan assembly comprising the manifold and the outlet tube provided herein, is designed to insure that the flow is uniform across the width of the cell, and that the pressure fluctuations within the cell are minimal. The flow uniformity requirement drives the need to insure that the back pressure associated with the flow's entry into the manifold is significantly greater than the pressure drop along the length of the manifold. The need to maintain an essentially constant internal pressure distribution drives the requirement to avoid slug or plug flow through the manifold and the outlet tubing. Therefore, the anode and/or cathode pan assembly comprising the manifold and the outlet tube as provided herein, is a critical design element enabling reliable cell operation across a high range of electrolyte flows and high current densities.

While the design of the anode and/or cathode pan assembly comprising the manifold and the outlet tube as provided herein, needs to insure that there are no slug or plug flow issues with the operation at high current densities; the cross sectional area of the manifold and the outlet tube also needs to be optimized to prevent too deep cells that are ineffective for operational and economical purposes. Applicants have designed the manifold and the outlet tube configurations with cross sectional areas that meet these needs.

As the current density is increased in the cell, power dissipation may also rise dramatically. Large spatial and/or temporal temperature fluctuations can damage the membrane. The contribution of the internal power dissipation to the cell's internal temperature distribution may be minimized through operating conditions such as the maintaining temperature, flow rate of the inflowing electrolyte, and/or re-circulation of the inflowing electrolyte. High electrolyte flow rates may maximize the convective heat transfer within a cell, thereby helping to minimize the heat buildup and concomitant temperature rise within the cell that may otherwise result from an increase in current density. Applicants have designed the baffle plate configuration inside the anode and/or cathode pan assembly to minimize the impact of the fluctuating power dissipation on the internal temperature of the cell.

In an electrochemical cell, there may be an anode pan that houses an anode and an anode electrolyte. There may be a cathode pan that houses a cathode and a cathode electrolyte and the anode pan and the cathode pan are separated by diaphragm, a membrane electrode assembly (MEA) or one or more ion exchange membranes (IEM). The anode pan and/or the cathode pan further comprise components, such as a collection system (together forming anode pan assembly or cathode pan assembly) that collects the gas and the liquid and flow them out of the cell. The IEM may be an anion exchange membrane (AEM), a cation exchange membrane (CEM), or both depending on the desired reactions at the anode and the cathode. In between these components, various additional separator components may be provided to separate, e.g. the AEM from the anode, the CEM from the cathode and/or AEM from the CEM as well as provide mechanical integrity to the membranes. In addition to these components, individual gaskets or gasket tape may be provided in between and along the outer perimeter of the components to seal the compartments from fluid leakage.

All the components described above may be aligned parallel to each other and optional peripheral bolting may be provided to stack them together in the electrochemical cell. In filter press configuration, no peripheral bolting may be required. In a stack of electrochemical cells, the anode of one electrochemical cell is in contact with the cathode of the adjacent electrochemical cell. The current passes through the stack of electrochemical cells during operation.

In an illustrative embodiment, the anode pan assembly or the cathode pan assembly of the invention is shown in FIG. 1 (figure on the right illustrates a front view of the assembly and figure on the left illustrates a cross section view of the assembly). It is to be understood that in the electrochemical cell, either the anode pan assembly as provided herein or the cathode pan assembly as provided herein or both may be used. For example, the assembly shown in FIG. 1 can be the anode pan assembly or the cathode pan assembly or both depending on the need and the reaction at the anode and the cathode. The next component of the cell such as the anode or the cathode would be placed on top of the anode pan assembly or the cathode pan assembly shown on the right in FIG. 1 which is a front view of the assembly.

As illustrated in FIG. 1, the anode pan assembly or the cathode pan assembly 100 comprises an anode pan or a cathode pan 101, respectively. Inside the depth of the anode pan or the cathode pan and at the top of the pan (shown in the left figure) is housed a manifold 102. The manifold 102 is fluidly connected to an outlet tube 103 through a nozzle. The manifold may be connected to one outlet tube or more depending on the requirement. For example, the design may incorporate 2, 3, 4, or more outlet tubes on each anode and/or cathode pan assembly, on same or either side in order to minimize the cell thickness, and maximize the number of cells that can fit in an electrolyzer frame or a particular size.

In one aspect, provided herein are anode and/or a cathode pan assembly, the methods to form, use and manufacture thereof, comprising: an anode and/or a cathode pan, and a manifold positioned inside the anode and/or the cathode pan, wherein cross sectional area of the manifold comprises depth of the manifold to be between about 0.25-0.75 of depth of the pan. In some embodiments, the foregoing anode and/or a cathode pan assembly further comprises the outlet tube.

In some embodiments, the depth of the manifold and/or the cross sectional area of the manifold and/or the outlet tube needs to be optimized to be deep enough to provide a large cross sectional area of the manifold in order to avoid slug and plug flow of the two phase system; but also to provide enough space between the wall of the manifold and the electrode placed on top of the pan for the gas and liquid to have an unimpeded flow and for the membrane to stay wetted. The depth of the manifold and/or the cross sectional area of the manifold and/or the outlet tube also dictates the thickness of the cell, therefore, the cross section area of the manifold is critical to achieving various functions in the cell.

In some embodiments of the anode and/or cathode pan assembly and methods thereof, the cross sectional area of the manifold comprises depth of the manifold to be between about 0.25-0.75 of depth of the pan; or between about 0.25-0.6 of depth of the pan; or between about 0.25-0.5 of depth of the pan; or between about 0.25-0.4 of depth of the pan; or between about 0.25-0.3 of depth of the pan; or between about 0.3-0.75 of depth of the pan; or between about 0.3-0.6 of depth of the pan; or between about 0.3-0.5 of depth of the pan; or between about 0.3-0.4 of depth of the pan; or between about 0.4-0.75 of depth of the pan; or between about 0.4-0.6 of depth of the pan; or between about 0.4-0.5 of depth of the pan; or between about 0.5-0.75 of depth of the pan; or between about 0.5-0.6 of depth of the pan; or between about 0.6-0.75 of depth of the pan.

Figure 2:
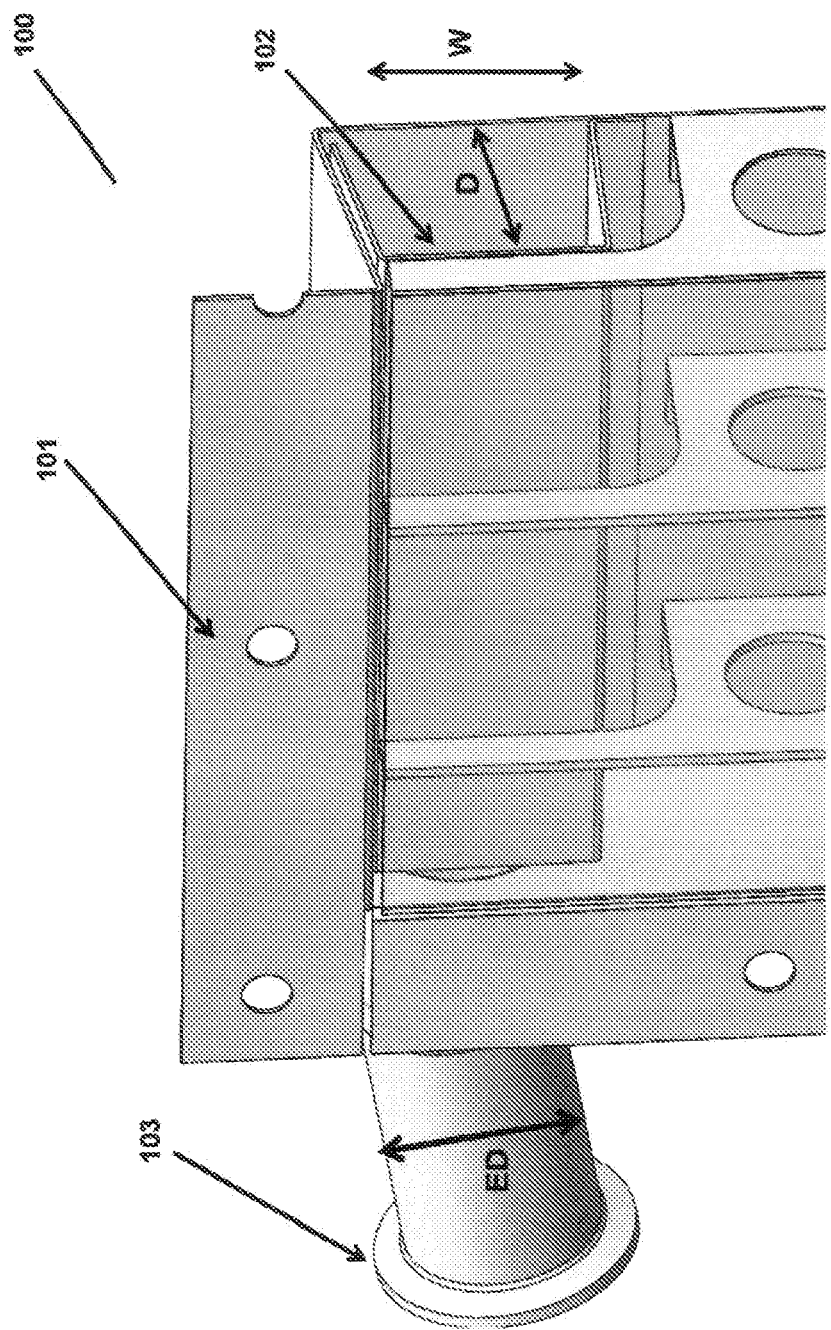
FIG. 2 illustrates some embodiments related to a cross-sectional and an enlarged view of the manifold inside the anode pan or the cathode pan and the outlet tube attached to the manifold through a nozzle.
Figure 3:
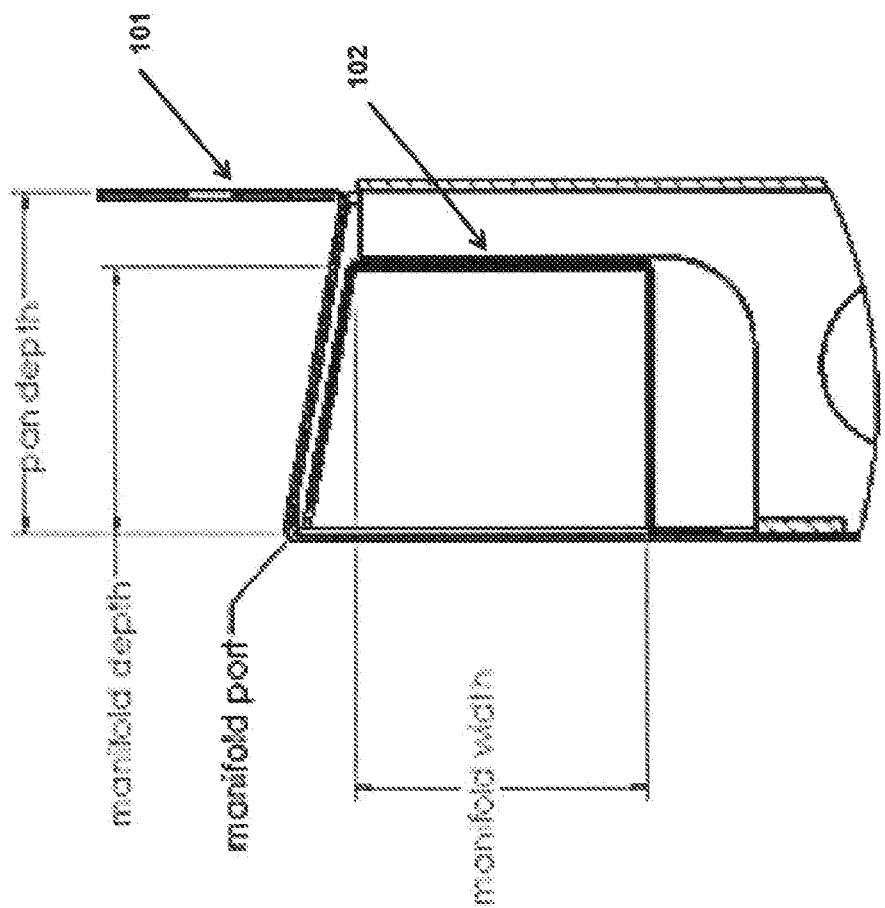
FIG. 3 illustrates some embodiments related to the orientation and configuration of the manifold in the anode pan or the cathode pan.

Another cross-sectional and enlarged view of the manifold inside the anode or the cathode pan and the outlet tube are shown in FIG. 2. The depth of the manifold 102 is marked as D and the width of the manifold is marked as W. The equivalent diameter of the outlet tube 103 is marked as ED. The depth of the manifold 102, the width of the manifold 102, and the depth of the anode or the cathode pan 101 is also illustrated in FIG. 3. As is evident, the manifold has an upward taper at the top. The upward taper creates an internal volume or zone, above the upper edge of the membrane positioned next to the electrode, providing a small region for gas-rich mixture to form without resulting in the drying out of the membrane.

Figure 4:
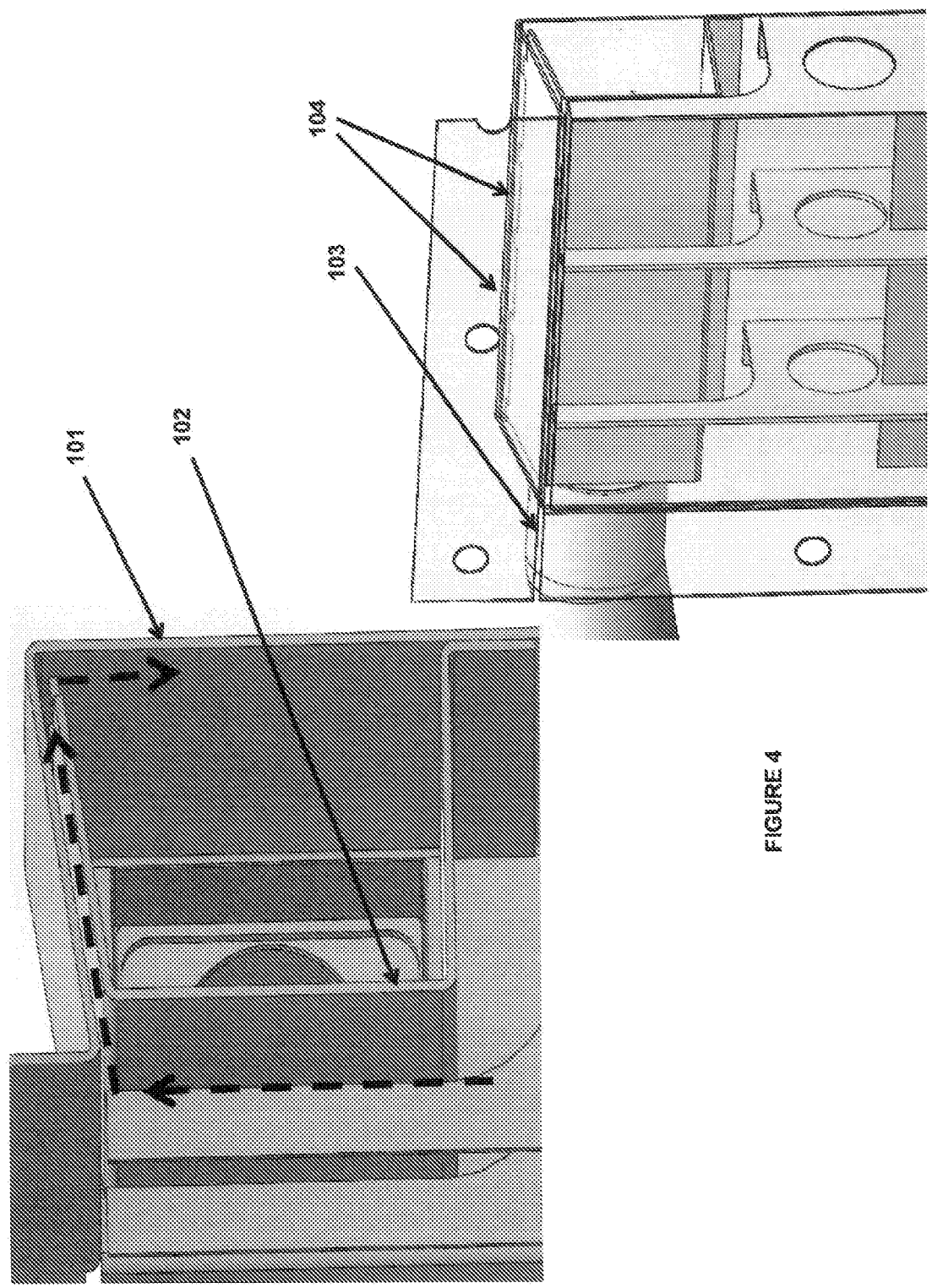
FIG. 4 illustrates some embodiments related to the direction of the flow of the gas and liquid through the manifold in the anode pan assembly or the cathode pan assembly.

The direction of the flow of the gas and the liquid through the anode pan assembly or the cathode pan assembly is shown as dotted lines in FIG. 4. The two phases of the gas and the liquid flow upwards to the top of the manifold 102 and flow down into the manifold through the notches 104 at the top. The gas and the liquid then flow out through the outlet tube 103.

In order to accommodate the large amount of the gas and the liquid flowing though the manifold and the outlet tube (due to high current densities and high flow rates) and to prevent slug and plug flow (and other benefits listed herein), in some embodiments the cross sectional area of the manifold and the outlet tube need to be large enough to maintain the superficial liquid velocity of anolyte and/or catholyte to be less than 0.1 m/s or less than 0.08 m/s or less than 0.05 m/s.

In some embodiments, the electrochemical cell comprising the anode and/or the cathode pan assembly disclosed herein, operates at high current densities of between about 300 mA/cm$^2$-6000 mA/cm$^2$; or between about 300 mA/cm$^2$-5000 mA/cm$^2$; or between about 300 mA/cm$^2$-4000 mA/cm$^2$; or between about 300 mA/cm$^2$-3000 mA/cm$^2$; or between about 300 mA/cm$^2$-2000 mA/cm$^2$; or between about 300 mA/cm$^2$-1000 mA/cm$^2$; or between about 300 mA/cm$^2$-800 mA/cm$^2$; or between about 300 mA/cm 2-600 mA/cm$^2$; or between about 300 mA/cm$^2$-500 mA/cm$^2$; or between about 500 mA/cm$^2$-6000 mA/cm$^2$; or between about 500 mA/cm$^2$-5000 mA/cm$^2$; or between about 500 mA/cm$^2$-4000 mA/cm$^2$; or between about 500 mA/cm$^2$-3000 mA/cm$^2$; or between about 500 mA/cm$^2$-2000 mA/cm$^2$; or between about 500 mA/cm$^2$-1000 mA/cm$^2$; or between about 500 mA/cm$^2$-800 mA/cm$^2$; or between about 500 mA/cm$^2$-600 mA/cm$^2$; or between about 600 mA/cm$^2$-6000 mA/cm$^2$; or between about 600 mA/cm$^2$-5000 mA/cm$^2$; or between about 600 mA/cm$^2$-4000 mA/cm$^2$; or between about 600 mA/cm$^2$-3000 mA/cm$^2$; or between about 600 mA/cm$^2$-2000 mA/cm$^2$; or between about 600 mA/cm$^2$-1000 mA/cm$^2$; or between about 600 mA/cm$^2$-800 mA/cm$^2$; or between about 800 mA/cm$^2$-6000 mA/cm$^2$; or between about 800 mA/cm 2-5000 mA/cm$^2$; or between about 800 mA/cm$^2$-4000 mA/cm$^2$; or between about 800 mA/cm$^2$-3000 mA/cm$^2$; or between about 800 mA/cm$^2$-2000 mA/cm$^2$; or between about 800 mA/cm$^2$-1000 mA/cm$^2$; or between about 1000 mA/cm$^2$-6000 mA/cm$^2$; or between about 1000 mA/cm$^2$-5000 mA/cm$^2$; or between about 1000 mA/cm$^2$-4000 mA/cm$^2$; or between about 1000 mA/cm$^2$-3000 mA/cm$^2$; or between about 1000 mA/cm$^2$-2000 mA/cm$^2$; or between about 2000 mA/cm$^2$-6000 mA/cm$^2$; or between about 2000 mA/cm$^2$-5000 mA/cm$^2$; or between about 2000 mA/cm$^2$-4000 mA/cm$^2$; or between about 2000 mA/cm$^2$-3000 mA/cm$^2$; or between about 3000 mA/cm$^2$-6000 mA/cm$^2$; or between about 3000 mA/cm$^2$-5000 mA/cm$^2$; or between about 3000 mA/cm$^2$-4000 mA/cm$^2$; or between about 4000 mA/cm$^2$-6000 mA/cm$^2$; or between about 5000 mA/cm$^2$-6000 mA/cm$^2$. In some embodiments, the electrochemical cell comprising the anode and/or the cathode pan assembly disclosed herein, operates at high current densities of between about 300 mA/cm$^2$-3000 mA/cm$^2$; or between about 300 mA/cm$^2$-2000 mA/cm$^2$; or between about 300 mA/cm$^2$-1000 mA/cm$^2$; or between about 300 mA/cm$^2$-800 mA/cm$^2$; or between about 300 mA/cm$^2$-600 mA/cm$^2$; or between about 300 mA/cm$^2$-500 mA/cm$^2$; or between about 300 mA/cm$^2$-400 mA/cm$^2$.

In some embodiments, the anode and/or the cathode pan assembly comprises a high flow rate of anolyte or catholyte, respectively, of between about 200-10,000 kg/h; or between about 200-9000 kg/h; or between about 200-8000 kg/h; or between about 200-7000 kg/h; or between about 200-6000 kg/h; or between about 200-5000 kg/h; or between about 200-4000 kg/h; or between about 200-3000 kg/h; or between about 200-2000 kg/h; or between about 200-1000 kg/h; or between about 500-10,000 kg/h; or between about 500-9000 kg/h; or between about 500-8000 kg/h; or between about 500-7000 kg/h; or between about 500-6000 kg/h; or between about 500-5000 kg/h; or between about 500-4000 kg/h; or between about 500-3000 kg/h; or between about 500-2000 kg/h; or between about 500-1000 kg/h; or between about 800-10,000 kg/h; or between about 800-9000 kg/h; or between about 800-8000 kg/h; or between about 800-7000 kg/h; or between about 800-6000 kg/h; or between about 800-5000 kg/h; or between about 800-4000 kg/h; or between about 800-3000 kg/h; or between about 800-2000 kg/h; or between about 800-1000 kg/h; or between about 1000-10,000 kg/h; or between about 1000-9000 kg/h; or between about 1000-8000 kg/h; or between about 1000-7000 kg/h; or between about 1000-6000 kg/h; or between about 1000-5000 kg/h; or between about 1000-4000 kg/h; or between about 1000-3000 kg/h; or between about 1000-2000 kg/h; or between about 3000-10,000 kg/h; or between about 3000-9000 kg/h; or between about 3000-8000 kg/h; or between about 3000-7000 kg/h; or between about 3000-6000 kg/h; or between about 3000-5000 kg/h; or between about 5000-10,000 kg/h; or between about 5000-8000 kg/h; or between about 5000-6000 kg/h; or between about 6000-10,000 kg/h; or between about 6000-8000 kg/h; or between about 8000-10,000 kg/h. Examples of the anolyte and/or catholyte include water or water with alkali, such as for example alkali metal hydroxide e.g. NaOH or KOH in water.

In order to accommodate the high current densities and the high flow rates and other benefits as noted herein, in some embodiments, the cross sectional area of the manifold (e.g. comprising the depth of the manifold to be between about 0.25-0.75 of the depth of the pan) is between about 520-6200 mm$^2$; or between about 520-6000 mm$^2$; or between about 520-5000 mm$^2$; or between about 520-4000 mm$^2$; or between about 520-3000 mm$^2$; or between about 520-2000 mm$^2$; or between about 520-1000 mm$^2$; or between about 600-6200 mm$^2$; or between about 600-6000 mm$^2$; or between about 600-5000 mm$^2$; or between about 600-4000 mm$^2$; or between about 600-3000 mm$^2$; or between about 600-2000 mm$^2$; or between about 600-1000 mm$^2$; or between about 800-6200 mm$^2$; or between about 800-6000 mm$^2$; or between about 800-5000 mm$^2$; or between about 800-4000 mm$^2$; or between about 800-3000 mm$^2$; or between about 800-2000 mm$^2$; or between about 800-1000 mm$^2$; or between about 1000-6200 mm$^2$; or between about 1000-6000 mm$^2$; or between about 1000-5000 mm$^2$; or between about 1000-4000 mm$^2$; or between about 1000-3000 mm$^2$; or between about 1000-2000 mm$^2$; or between about 2000-6200 mm$^2$; or between about 2000-5000 mm$^2$; or between about 2000-4000 mm$^2$; or between about 2000-3000 mm$^2$; or between about 3000-6000 mm$^2$; or between about 3000-5000 mm$^2$; or between about 3000-4000 mm$^2$; or between about 4000-6000 mm$^2$; or between about 4000-5000 mm$^2$; or between about 5000-6000 mm$^2$.

Accordingly, in some embodiments of the above noted cross sectional area of the manifold, the outlet tube fluidly connected to the manifold has an equivalent diameter of the outlet tube to be between about 26-89 mm; or between about 26-80 mm; or between about 26-75 mm; or between about 26-70 mm; or between about 26-60 mm; or between about 26-50 mm; or between about 26-40 mm; or between about 26-30 mm; or between about 30-89 mm; or between about 30-80 mm; or between about 30-75 mm; or between about 30-70 mm; or between about 30-60 mm; or between about 30-50 mm; or between about 30-40 mm; or between about 40-89 mm; or between about 40-80 mm; or between about 40-75 mm; or between about 40-70 mm; or between about 40-60 mm; or between about 40-50 mm; or between about 50-89 mm; or between about 50-80 mm; or between about 50-75 mm; or between about 50-70 mm; or between about 50-60 mm; or between about 60-89 mm; or between about 60-80 mm; or between about 60-75 mm; or between about 70-89 mm; or between about 70-80 mm.

It is to be understood that the high liquid flow rate may be in comparison to the electrochemical cells of a particular size. For example, the high flow rate for the relatively narrow cell, e.g. 300-600 mm wide, may correspond to a flow rate to be about 200 kg/h or more or the high flow rate for a large commercial size cell, e.g. 2-3 m wide, may correspond to the flow rate of about 800 kg/h or more. The cross sectional area of the manifold, the cross sectional area of the outlet tube, and/or the baffle plate accommodate for the high liquid flow rates and high gas flow rates associated with operation at the high current density and insure the superficial liquid velocity to be less than 0.1 m/s such that neither slug nor plug flow develop.

In some embodiments, the anode and/or the cathode pan assembly comprises the high flow rate of anolyte or catholyte, respectively, of between about 200-5000 kg/h; or between about 200-4000 kg/h; or between about 200-3000 kg/h; or between about 200-2500 kg/h; or between about 200-2000 kg/h; or between about 200-1000 kg/h; and the cross sectional area of the manifold (e.g. comprising the depth of the manifold to be between about 0.25-0.75 of the depth of the pan) is between about 300-6200 $mm^2$; or between about 300-6000 $mm^2$; or between about 300-5000 $mm^2$; or between about 300-4000 $mm^2$; or between about 300-3000 $mm^2$; or between about 300-2000 $mm^2$; or between about 300-1000 $mm^2$; or between about 300-500 $mm^2$;

wherein the superficial liquid velocity of the anolyte and/or the catholyte is less than 0.1 m/s or less than 0.08 m/s or less than 0.05 m/s or less than 0.01 m/s.

In some embodiments, the aforementioned anode and/or the cathode pan assembly further comprises the outlet tube fluidly connected to the manifold having an equivalent diameter to be between about 26-89 mm.

In some embodiments, the electrochemical cell comprising the aforementioned anode and/or the cathode pan assembly disclosed herein, operates at high current densities of between about 300 $mA/cm^2$-3000 $mA/cm^2$; or between about 300 $mA/cm^2$-2000 $mA/cm^2$; or between about 300 $mA/cm^2$-1000 $mA/cm^2$; or between about 300 $mA/cm^2$-800 $mA/cm^2$; or between about 300 $mA/cm^2$-600 $mA/cm^2$; or between about 300 $mA/cm^2$-500 $mA/cm^2$; or between about 300 $mA/cm^2$-400 $mA/cm^2$.

In one aspect, there is also provided a baffle plate configuration inside the anode and/or cathode pan assembly to minimize the impact of the fluctuating power dissipation on the internal temperature of the cell. Applicants have designed the baffle plate, which is suspended in the anode and/or the cathode pan assembly, located between the pan floor on one side and electrode on the other side.

In one aspect, there is provided an anode and/or a cathode pan assembly, comprising: an anode and/or a cathode pan; one or more ribs inside the pan comprising one or more notches; and a baffle plate comprising one or more or two or more slots configured to fit over the one or more notches of the one or more ribs.

In one aspect, there is provided an anode and/or a cathode pan assembly, comprising: an anode and/or a cathode pan; a manifold positioned inside the anode and/or the cathode pan, wherein cross sectional area of the manifold comprises depth of the manifold to be between about 0.25-0.75 of depth of the pan; one or more ribs inside the pan comprising one or more notches, and a baffle plate comprising two or more slots configured to fit over the one or more notches of the one or more ribs. In some embodiments, the foregoing anode and/or a cathode pan assembly further comprises the outlet tube. The cross sectional areas of the manifold and the outlet tube have been provided herein.

An illustration of the anode and/or the cathode pan assembly is as shown in FIG. 5. The figure on the right in FIG. 5 illustrates a front view of the anode and/or cathode pan assembly and the left figure illustrates a cross sectional view of the pan assembly. The anode pan assembly and/or the cathode pan assembly 200 comprise an anode and/or a cathode pan 201 with the baffle plate 202 fitted in the pan. The baffle plate comprises two or more slots 203. The baffle plate may have any number of slots depending on the number of ribs in the pan and the number of notches on the ribs. The number of slots can be e.g. between about 2-200 in the baffle plate. This baffle plate 202 is fitted over the vertical ribs 204 in the anode and/or cathode pan 201. The one or more ribs are perpendicular to the anode pan and/or the cathode pan and the baffle plate is perpendicular to the one or more ribs. Therefore, the baffle plate is parallel to the anode and/or cathode pan. The positioning of the one or more ribs with one or more notches and the fitting of the two or more slots of the baffle plate over the one or more notches of the one or more ribs is as illustrated in FIG. 6.

Figure 6:
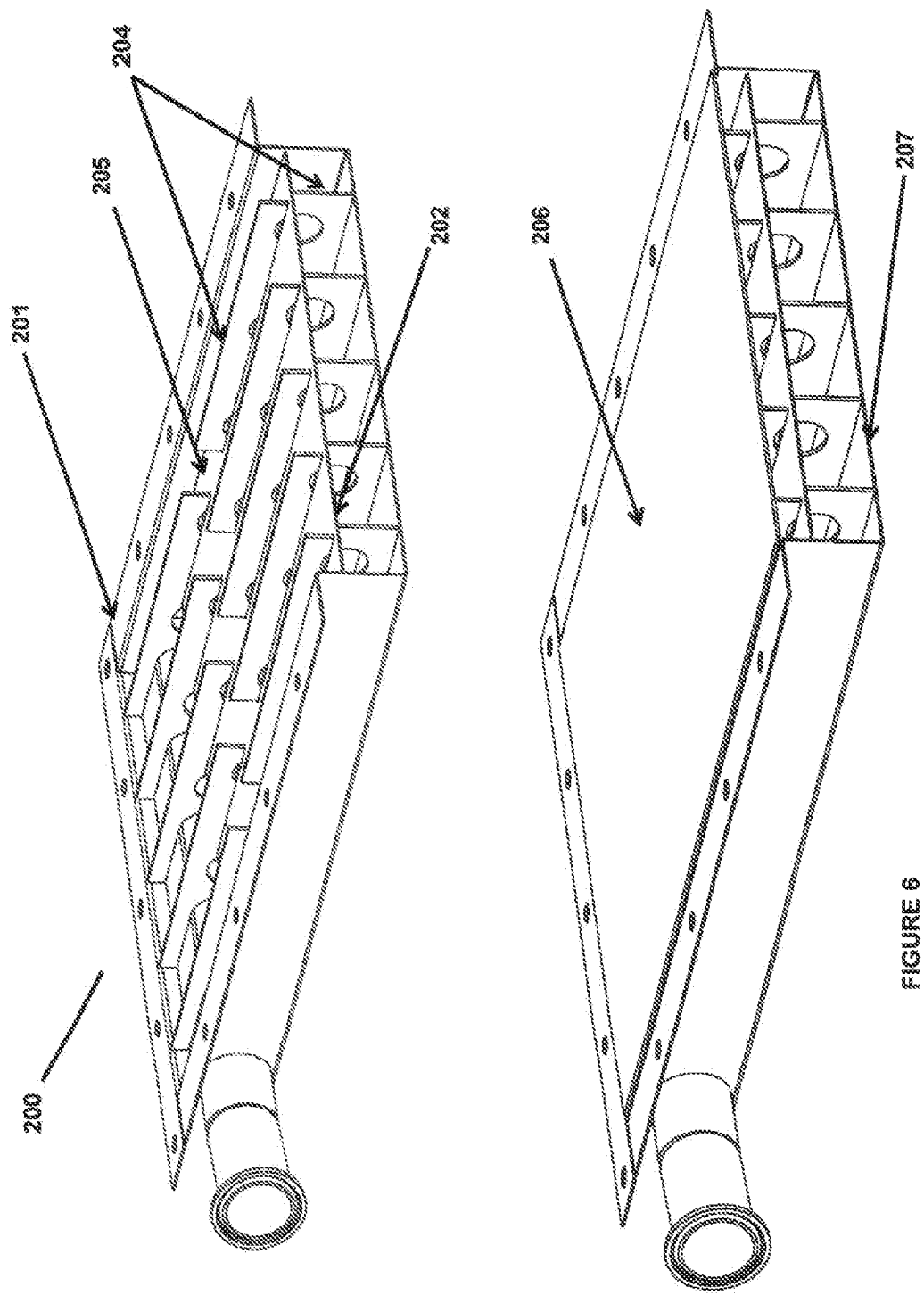
FIG. 6 illustrates some embodiments related to a cross-sectional view of the anode or the cathode pan assembly illustrating two or more slots of the baffle plate fitted over the one or more notches of the one or more ribs inside the anode pan or the cathode pan.

As illustrated in FIG. 6, the one or more ribs 204 have one or more notches 205. The one or more ribs 204 are positioned perpendicular to the anode and/or the cathode pan 201. The baffle plate 202 with two or more slots 203 (may also be slits or cut outs) are configured to fit over the one or more notches 205 of the one or more ribs 204. The slots are not visible in FIG. 6 as the slots have been fitted with the ribs 204. The one or more notches 205 of the one or more ribs 204 facilitate suspension of the baffle plate 202 in the pan. The electrode 206 may be attached at the top of the anode pan assembly and/or the cathode pan assembly 200. The baffle plate is suspended between the electrode 206 and the anode and/or cathode pan or pan floor 207. The distance of the baffle plate from the electrode can be increased or decreased by increasing the depth of the notches on the ribs.

Another design of the baffle plate (not shown in the figures) is a baffle plate with one or more long slots that fit over the entire length of the rib. In such embodiments, the number of the long slots on the baffle plate is equivalent to the number of the ribs in the pan. In such embodiments, the rib may not have notches or may have a notch at the top and bottom of each rib to fit the baffle plate with the long slot over the rib. All of these embodiments are well within the scope of the invention. All the geometry and the dimensions provided herein for the ribs and the baffle plate apply to the aforementioned embodiment.

Figure 7:
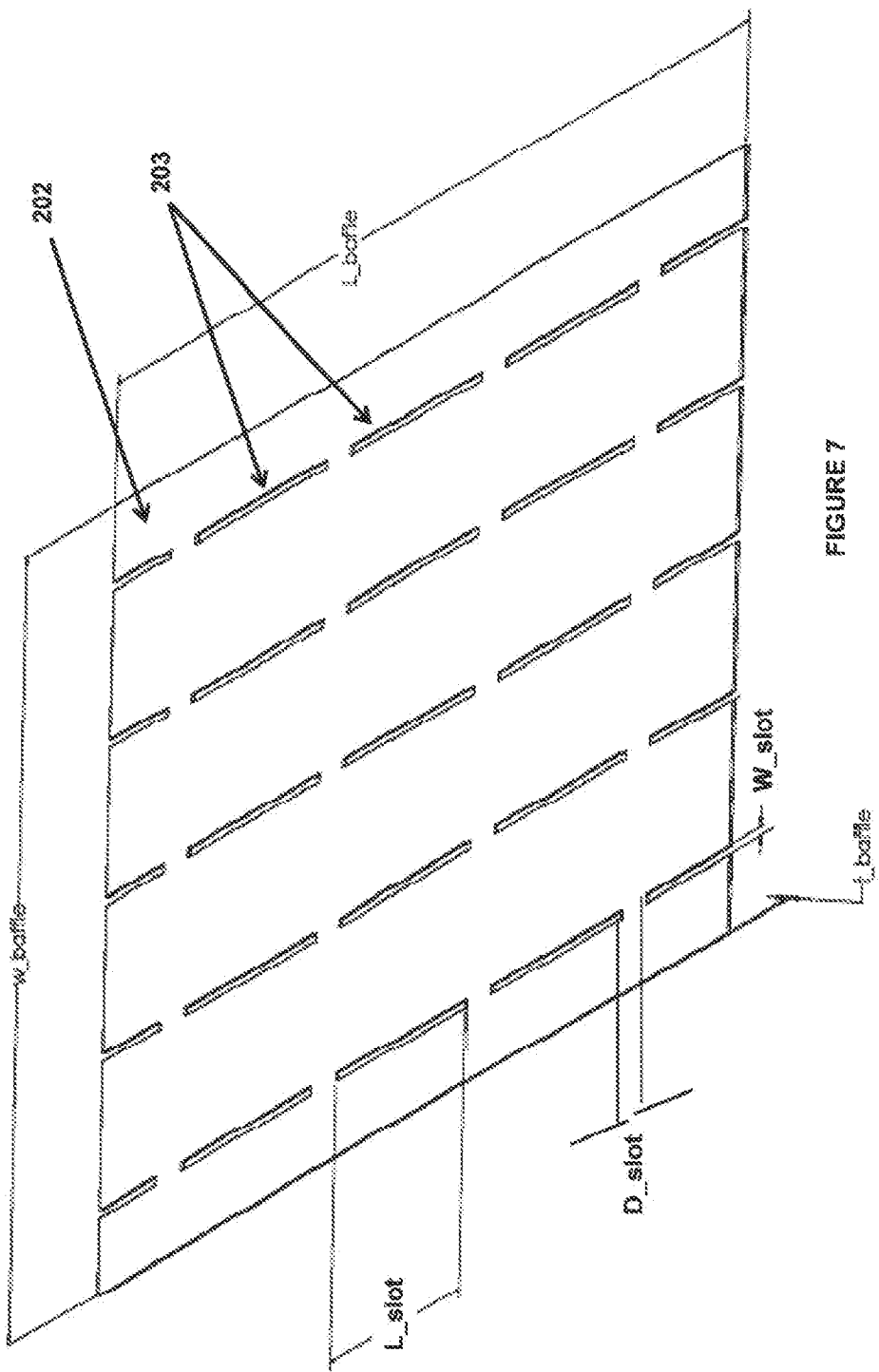
FIG. 7 illustrates some embodiments related to the front view of the baffle plate with slots.

The baffle plate 202 is being illustrated in FIG. 7. As shown in FIG. 7, the baffle plate 202 comprises two or more slots 203 throughout the plate. The positioning of the slots, the length of the slots, and/or the distance between the slots dictate the fitting of the baffle plate over the one or more ribs as the slots of the baffle plate fit over the notches of the one or more ribs. The baffle plate can be a solid plate with slots (such as e.g. shown in FIG. 7) or in some embodiments, the baffle plate is an expanded metal plate, or a mesh. The baffle plate may be made of any conductive metal, such as, but not limited to, nickel, stainless steel, etc.

In some embodiments, the width of the slot in the baffle plate is equal to width of the rib so that the slot fits over the rib. The width of the slot is being shown in FIG. 7 as W slot.

The length of the slot (shown as L slot in FIG. 7) equals the length of the rib in between the two notches. In some embodiments, the length of the slot (equals the length of the rib) is between about 0.25-1.0 m; or between about 0.25-0.8 m; or between about 0.25-0.6 m; or between about 0.25-0.5 m; or between about 0.25-0.4 m; or between about 0.25-0.3 m; or between about 0.5-1.0 m; or between about 0.5-0.8 m; or between about 0.5-0.6 m; or between about 0.6-1.0 m; or between about 0.6-0.8 m; or between about 0.7-1.0 m; or between about 0.7-0.8 m; or between about 0.8-1.0 m.

In some embodiments, distance between slots (shown as D slot in FIG. 7) is equal to length of the notches in the ribs so that the slots fit over the one or more notches of the one or more ribs. In some embodiments, the distance between the two or more slots or the length of the one or more notches is between about 5-100 mm; or between about 5-80 mm; or between about 5-60 mm; or between about 5-50 mm; or between about 5-40 mm; or between about 5-30 mm; or between about 5-20 mm; or between about 5-10 mm; or between about 10-100 mm; or between about 10-50 mm; or between about 10-40 mm; or between about 10-30 mm; or between about 10-20 mm; or between about 20-100 mm; or between about 20-50 mm; or between about 20-40 mm; or between about 20-30 mm; or between about 30-100 mm; or between about 30-50 mm; or between about 30-40 mm; or between about 40-100 mm; or between about 40-50 mm; or between about 50-100 mm; or between about 75-100 mm.

As described earlier, the contribution of the internal power dissipation to the cell's internal temperature distribution can be minimized through operating conditions such as the temperature and flow rate of the inflowing electrolyte. High electrolyte flow rates may maximize the convective heat transfer within a cell, thereby helping to minimize the heat buildup, and concomitant temperature rise, within the cell that would otherwise result from the high current densities described herein. As discussed above, operating at high electrolyte flow rates and high current densities can lead to slugging at the cell outlet which can result in pressure fluctuations that can shorten a membrane's lifetime. The pan assemblies described herein with manifold and outlet configurations and/or the baffle plate configurations are designed to avoid or minimize slug and plug flow.

At high current densities described herein, the electrolyte may be heated to 10-100's of degrees Celsius as it flows through the cell. Top to bottom mixing may be required to enable operation at high current densities. Such mixing can be achieved by including the baffle plate, as described herein, partitioning between the electrode and the cathode or the anode pan floor (pan floor shown as 207 in FIG. 6).

Figure 8:
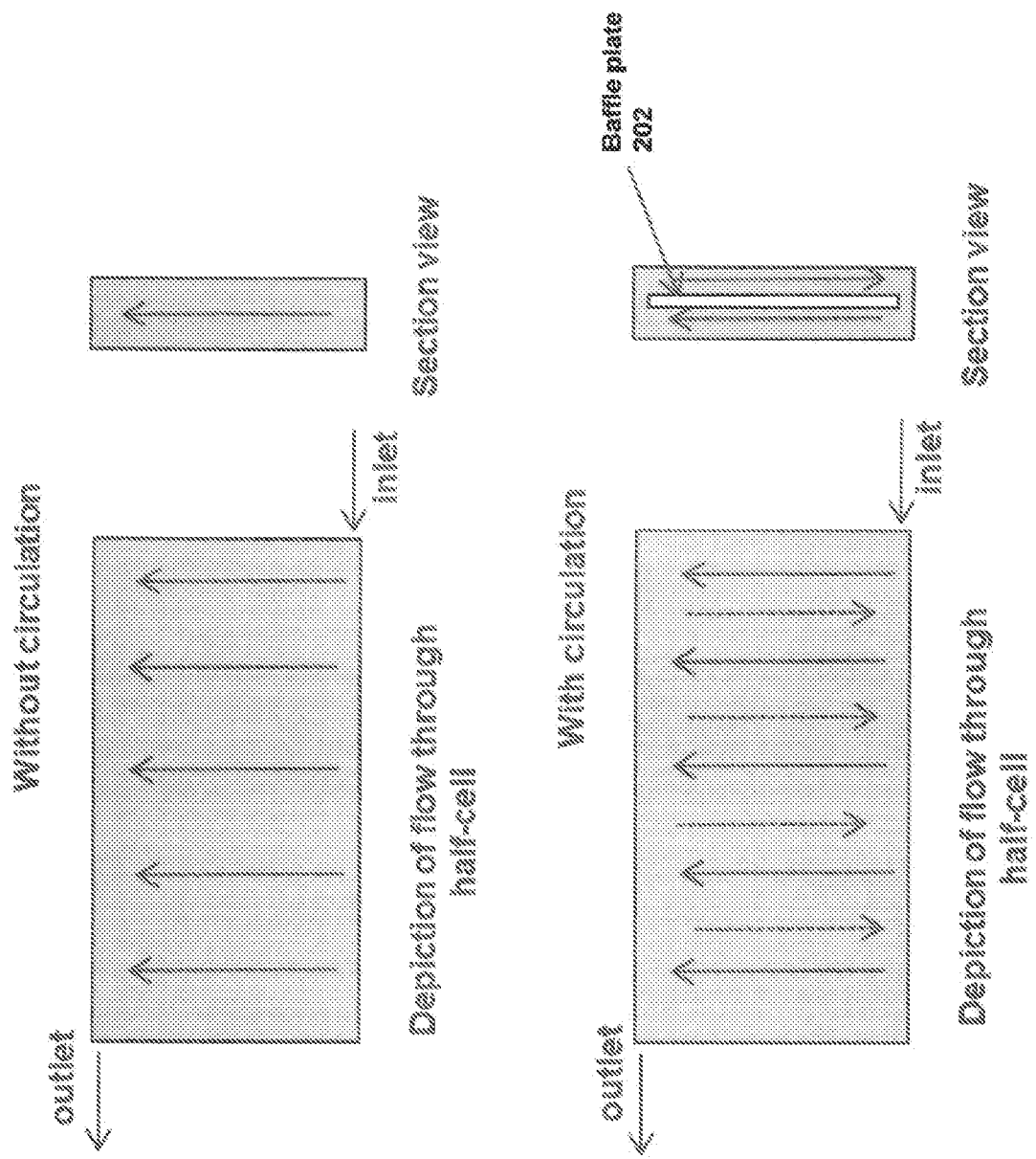
FIG. 8 is an illustration of some embodiments related to the electrolyte flow through the half cell with and without the baffle plate.

In some embodiments, the baffle plate is designed and positioned in such a way, that the gas produced at the electrode may mix with the electrolyte on the electrode side of the baffle plate, resulting in a relatively low density column and defining a riser section. The low density mixture may rise relatively quickly through the riser section. Once above the top of the baffle plate, the gas may disengage and flow into the manifold and outlet tube, while a fraction of the electrolyte may drop back down the back side of the baffle plate (on the pan floor side) into the down-comer region, thereby defining a circulation loop. This circulation loop has been illustrated in FIG. 8 where the comparison is shown without the baffle plate and with the baffle plate. The riser section is shown as an upward arrow and the down-comer section is shown as a downward arrow. The baffle plate can be used to create rapidly flowing circulation loops that insure the electrolyte remains substantially isothermal as it flow through the cathode or the anode. Due to the high degree of top-bottom mixing and circulation, rapid thermal equilibration of the inflowing electrolyte can be achieved. Another advantage is that relatively cold liquid can be introduced into the cell which can equilibrate with the warm circulating fluid. The circulation rate (or laps of the recirculation loop during electrolyte transit through the cell) can be anywhere from 1 to 200. The high circulation rate can also drive larger shear rates adjacent to the membrane, helping to sweep gas away from the membrane.

Applicants discovered that the positioning of the baffle plate with respect to its distance from the electrode as well as the pan floor and/or its width and length, affect the velocity of the riser section as well as the down-comer section thereby affecting the circulation rate. If the baffle plate is located beyond some critical distance from the electrode, it may not drive a circulation pattern. Free convection of the relatively light, gas-rich zone adjacent to the electrode may rise relatively rapidly compared to the slowly rising liquid further in from the electrode. The resultant shear forces may drag up some of the liquid. That liquid may fall back down on the electrode side of the baffle plate as the gas disengages at the top of the cell, resulting in a weak circulation forming on the electrode side of the baffle plate. In that case, the baffle plate may not divide a riser section from a down-comer section, and a strong circulation may not form. If the baffle plate is too close to the electrode, the space between the electrode and the baffle plate may fill with gas, choking the liquid flow in that region. Moreover, the high volume fraction of gas in that region may result in the membrane and/or the electrode masking, and poor electrical and thermal transport.

The optimal baffle offset or distance from the electrode may be different for the cathode pan assembly and anode pan assembly due to the different material properties of the gases generated within each half-cell ($O_2$ in anode and $H_2$ in cathode). For example, the $H_2$ gas may be lighter than the $O_2$ gas; the bubble size may also be different; and for any given current density through the cell, twice as many moles of $H_2$ may be produced compared to $O_2$. Therefore, due to the different properties of the $H_2$ gas and the $O_2$ gas, the $H_2$ gas may lift faster and the distance between the baffle plate and the electrode may need to be adjusted.

Figure 9:
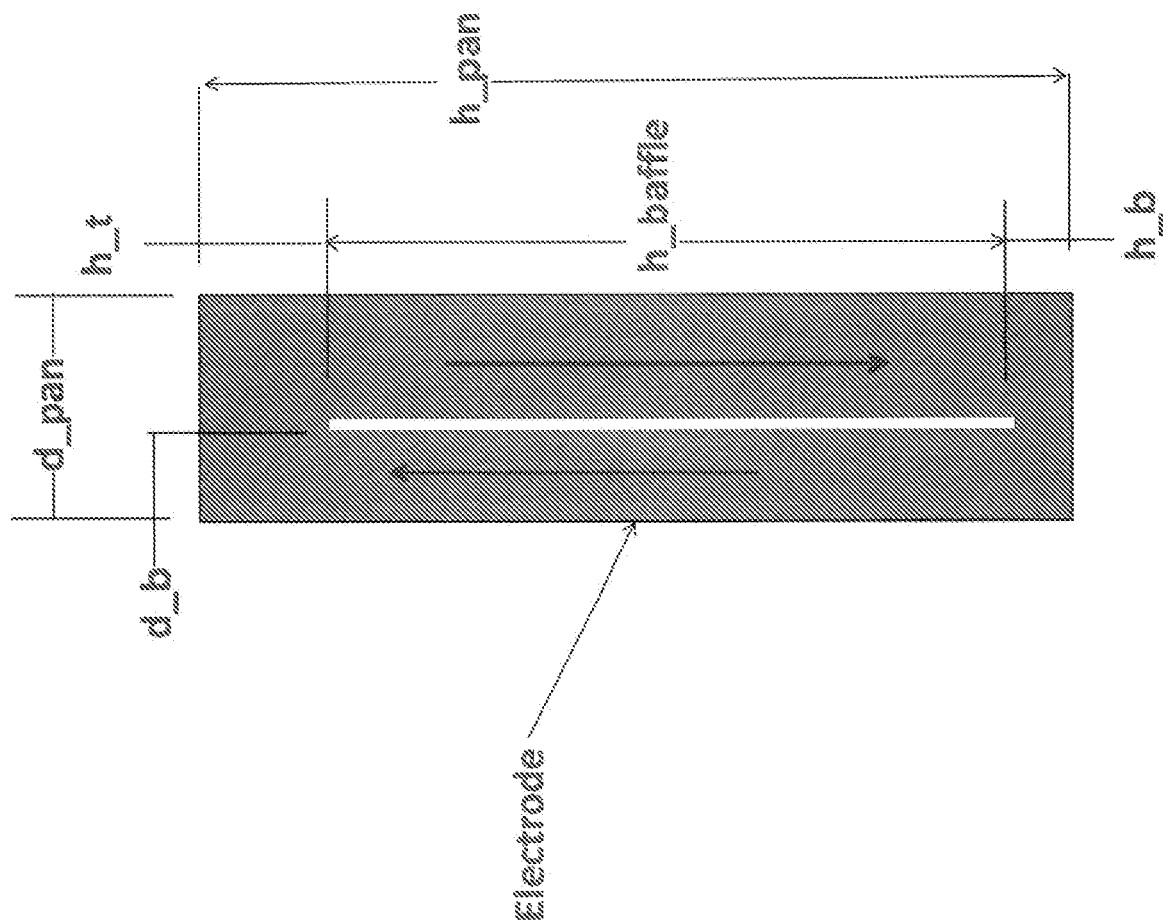
FIG. 9 illustrates some embodiments related to the positioning and dimensions of the baffle plate inside the anode pan or the cathode pan.

The pan depth (d_pan), the relative location of the baffle through the depth of the pan (d_b), the height of the baffle relative to the cell height (h_baffle), and/or the baffle plate's vertical location in the pan (distance of the baffle plate from the top of the pan h_t and distance of the baffle plate from the bottom of the pan h_b), as illustrated in FIG. 9, may impact the circulation pattern of the electrolyte.

In some embodiments, in the anode and/or the cathode pan assembly the distance of the baffle plate from the electrode (d_b as illustrated in FIG. 9) is between about 5-15 mm; or between about 5-12 mm; or between about 5-10 mm; or between about 5-8 mm; or between about 5-6 mm; or between about 6-15 mm; or between about 6-12 mm; or between about 6-10 mm; or between about 6-8 mm; or between about 8-15 mm; or between about 8-12 mm; or between about 8-10 mm; or between about 10-15 mm; or between about 10-12 mm; or between about 12-15 mm. In some embodiments, the distance of the baffle plate from the electrode is equivalent to the depth of the notches on the ribs.

In some embodiments, in the anode and/or the cathode pan assembly the placement of the baffle plate is at between about 0.25-0.5 depth of the anode and/or the cathode pan; or between about 0.25-0.4; or between about 0.25-0.3; or between about 0.3-0.5; or between about 0.4-0.5 depth of the anode and/or the cathode pan.

In some embodiments, in the anode and/or the cathode pan assembly the height of the baffle plate is such that it leaves space at the top and/or bottom of the anode and/or the cathode pan for gas and liquid flow (distance of the baffle plate from the top of the pan h_t and distance of the baffle plate from the bottom of the pan h_b, e.g. as illustrated in FIG. 9). In some embodiments where the manifold and the baffle plate both are present in the cell, depending on the depth of the manifold and the placement of the baffle plate with respect to the depth of the pan, the baffle plate may run behind the manifold (between the manifold and the electrode) towards the top of the cell or the baffle plate may end below the manifold. In either embodiment, the baffle plate leaves space at the top and/or bottom of the anode and/or the cathode pan for gas and liquid flow.

In some embodiments, in the anode and/or the cathode pan assembly the space between the baffle plate and bottom of the anode and/or the cathode pan (h_b as illustrated in FIG. 9) is between about 6-75 mm; or between about 6-65 mm; or between about 6-50 mm; or between about 6-40 mm; or between about 6-30 mm; or between about 6-20 mm; or between about 6-10 mm; or between about 10-75 mm; or between about 10-65 mm; or between about 10-50 mm; or between about 10-40 mm; or between about 10-30 mm; or between about 10-20 mm; or between about 10-15 mm; or between about 20-75 mm; or between about 20-65 mm; or between about 20-50 mm; or between about 20-40 mm; or between about 20-30 mm; or between about 30-75 mm; or between about 30-65 mm; or between about 30-50 mm; or between about 30-40 mm; or between about 40-75 mm; or between about 40-65 mm; or between about 50-75 mm; or between about 50-65 mm; or between about 60-75 mm. In some embodiments, the space between the baffle plate and top of the anode and/or the cathode pan or the bottom of the manifold (h_t as illustrated in FIG. 9) is between about 6-150 mm; or between about 6-140 mm; or between about 6-130 mm; or between about 6-120 mm; or between about 6-110 mm; or between about 6-100 mm; or between about 6-80 mm; or between about 6-70 mm; or between about 6-50 mm; or between about 6-25 mm; or between about 10-150 mm; or between about 10-140 mm; or between about 10-130 mm; or between about 10-120 mm; or between about 10-110 mm; or between about 10-100 mm; or between about 10-80 mm; or between about 10-70 mm; or between about 10-50 mm; or between about 10-25 mm; or between about 25-150 mm; or between about 25-140 mm; or between about 25-130 mm; or between about 25-120 mm; or between about 25-110 mm; or between about 25-100 mm; or between about 25-80 mm; or between about 25-70 mm; or between about 25-50 mm; or between about 50-150 mm; or between about 50-140 mm; or between about 50-130 mm; or between about 50-120 mm; or between about 50-110 mm; or between about 50-100 mm; or between about 50-80 mm; or between about 50-70 mm; or between about 100-150 mm; or between about 100-140 mm; or between about 100-130 mm; or between about 100-120 mm; or between about 125-150 mm; or between about 125-140 mm; or between about 130-150 mm; or between about 75-120 mm. It is to be understood that any of aforementioned dimensions for the space between the baffle plate and bottom of the anode and/or the cathode pan and the dimensions for the space between the baffle plate and top of the anode and/or the cathode pan or the bottom of the manifold, may be combined in order to achieve the optimum circulation pattern of the electrolyte.

In some embodiments, in the anode and/or the cathode pan assembly the space between the baffle plate and bottom of the anode and/or the cathode pan (h_b as illustrated in FIG. 9) is between about 6-75 mm; and the space between the baffle plate and top of the anode and/or the cathode pan or the bottom of the manifold (h_t as illustrated in FIG. 9) is between about 6-150 mm.

In some embodiments, the anode and/or the cathode pan assembly provided herein, with the aforementioned manifold and the outlet tube and/or the baffle plate provide several advantages such as, but not limited to, accommodate aforementioned high flow rate of anolyte or catholyte and/or gas preventing slug or plug flow; prevent large spatial and/or temporal temperature fluctuations; prevent pressure fluctuations due to multiphase flow in the cell to less than 0.5 psi; and/or prevent membrane erosion and/or fatigue.

In some embodiments, the anode and/or the cathode pan assembly provided herein is inside a hydrogen gas producing electrochemical cell.

Accordingly, in one aspect, there is provided an electrochemical cell, such as e.g. a hydrogen gas producing electrochemical cell, comprising: an anode pan assembly comprising an anode pan, and a manifold positioned inside the anode pan, wherein cross sectional area of the manifold comprises depth of the manifold to be between about 0.25-0.75 of depth of the pan. In some embodiments of the aforementioned aspect, the electrochemical cell further comprises an anode positioned on the anode pan assembly; a cathode positioned on a cathode pan assembly; and an ion exchange membrane disposed between the anode and the cathode. In some embodiments of the aforementioned aspect, the anode pan assembly further comprises the outlet tube.

In one aspect, there is provided an electrochemical cell, such as e.g. a hydrogen gas producing electrochemical cell, comprising: an anode pan assembly comprising an anode pan; one or more ribs inside the pan comprising one or more notches; and a baffle plate comprising two or more slots configured to fit over the one or more notches of the one or more ribs. In some embodiments of the aforementioned aspect, the electrochemical cell further comprises an anode positioned on the anode pan assembly; a cathode positioned on a cathode pan assembly; and an ion exchange membrane disposed between the anode and the cathode.

In one aspect, there is provided an electrochemical cell, such as e.g. a hydrogen gas producing electrochemical cell, comprising: an anode pan assembly comprising an anode pan; a manifold positioned inside the anode pan, wherein cross sectional area of the manifold comprises depth of the manifold to be between about 0.25-0.75 of depth of the pan; one or more ribs inside the pan comprising one or more notches; and a baffle plate comprising two or more slots configured to fit over the one or more notches of the one or more ribs. In some embodiments of the aforementioned aspect, the electrochemical cell further comprises an anode positioned on the anode pan assembly; a cathode positioned on a cathode pan assembly; and an ion exchange membrane disposed between the anode and the cathode.

The cathode pan assembly in the aforementioned three aspects may be any conventional cathode pan assembly.

In some embodiments of the aforementioned aspects, the electrochemical cell further comprises the outlet tube. Various dimensions of the cross sectional area of the manifold; of the cross sectional area of the outlet tube; the notches in the ribs and the slots in the baffle plate; and/or the location and the placement of the components, have all been described herein and can be applied to any of the aforementioned aspects.

In one aspect, there is provided an electrochemical cell, such as e.g. a hydrogen gas producing electrochemical cell, comprising: a cathode pan assembly comprising a cathode pan, and a manifold positioned inside the cathode pan, wherein cross sectional area of the manifold comprises depth of the manifold to be between about 0.25-0.75 of depth of the pan. In some embodiments of the aforementioned aspect, the electrochemical cell further comprises an anode positioned on an anode pan assembly; a cathode positioned on the cathode pan assembly; and an ion exchange membrane disposed between the anode and the cathode.

In one aspect, there is provided an electrochemical cell, such as e.g. a hydrogen gas producing electrochemical cell, comprising: a cathode pan assembly comprising a cathode pan; one or more ribs inside the pan comprising one or more notches; and a baffle plate comprising two or more slots configured to fit over the one or more notches of the one or more ribs. In some embodiments of the aforementioned aspect, the electrochemical cell further comprises an anode positioned on an anode pan assembly; a cathode positioned on the cathode pan assembly; and an ion exchange membrane disposed between the anode and the cathode.

In one aspect, there is provided an electrochemical cell, such as e.g. a hydrogen gas producing electrochemical cell, comprising: a cathode pan assembly comprising a cathode pan; a manifold positioned inside the cathode pan, wherein cross sectional area of the manifold comprises depth of the manifold to be between about 0.25-0.75 of depth of the pan; one or more ribs inside the pan comprising one or more notches; and a baffle plate comprising two or more slots configured to fit over the one or more notches of the one or more ribs. In some embodiments of the aforementioned aspect, the electrochemical cell further comprises an anode positioned on an anode pan assembly; a cathode positioned on the cathode pan assembly; and an ion exchange membrane disposed between the anode and the cathode.

The anode pan assembly in the aforementioned three aspects may be any conventional anode pan assembly.

In some embodiments of the aforementioned aspects, the electrochemical cell further comprises the outlet tube. Various dimensions of the cross sectional area of the manifold; of the cross sectional area of the outlet tube; the notches in the ribs and the slots in the baffle plate; and/or the location and the placement of the components, have all been described herein and can be applied to any of the aforementioned aspects.

In one aspect, there is provided an electrochemical cell, such as e.g. a hydrogen gas producing electrochemical cell, comprising:
  an anode pan assembly comprising an anode pan, and a manifold positioned inside the anode pan, wherein cross sectional area of the manifold comprises depth of the manifold to be between about 0.25-0.75 of depth of the pan;
  an anode positioned on the anode pan assembly;
  a cathode pan assembly comprising a cathode pan, and a manifold positioned inside the cathode pan, wherein cross sectional area of the manifold comprises depth of the manifold to be between about 0.25-0.75 of depth of the pan;
  a cathode positioned on the cathode pan assembly; and
  an ion exchange membrane disposed between the anode and the cathode.

In one aspect, there is provided an electrochemical cell, such as e.g. a hydrogen gas producing electrochemical cell, comprising:
  an anode pan assembly comprising an anode pan, one or more ribs inside the pan comprising one or more notches, and a baffle plate comprising two or more slots configured to fit over the one or more notches of the one or more ribs;
  an anode positioned on the anode pan assembly;
  a cathode pan assembly comprising a cathode pan, one or more ribs inside the pan comprising one or more notches, and a baffle plate comprising two or more slots configured to fit over the one or more notches of the one or more ribs;
  a cathode positioned on the cathode pan assembly; and
  an ion exchange membrane disposed between the anode and the cathode.

In one aspect, there is provided an electrochemical cell, such as e.g. a hydrogen gas producing electrochemical cell, comprising:
  an anode pan assembly comprising an anode pan, a manifold positioned inside the anode pan, wherein cross sectional area of the manifold comprises depth of the manifold to be between about 0.25-0.75 of depth of the pan, one or more ribs inside the pan comprising one or more notches, and a baffle plate comprising two or more slots configured to fit over the one or more notches of the one or more ribs;
  an anode positioned on the anode pan assembly;
  a cathode pan assembly comprising a cathode pan, a manifold positioned inside the cathode pan, wherein cross sectional area of the manifold comprises depth of the manifold to be between about 0.25-0.75 of depth of the pan, one or more ribs inside the pan comprising one or more notches, and a baffle plate comprising two or more slots configured to fit over the one or more notches of the one or more ribs;
  a cathode positioned on the cathode pan assembly; and
  an ion exchange membrane disposed between the anode and the cathode.

In some embodiments, there is provided an electrolyzer comprising multiplicity of aforementioned aspects of individual electrochemical cells.

The components of the anode and/or cathode pan assembly may be made from an electro conductive material such as, but not limited to, nickel, stainless steel, stainless steel alloys, and the like. The anode and the cathode pans may be made of a conductive metal. The conductive metal includes any conductive metal suitable to be used as an anode pan or the cathode pan. For example, in some embodiments, the anode pan in the anode pan assembly or the cathode pan in the cathode pan assembly is made of a conductive metal such as, but not limited to, nickel, stainless steel, stainless steel alloys, and the like.

The electrolyzer may comprise a single cell or a stack of cells connected in series or in parallel. The electrolyzer may be a stack of 5 or 6 or 50 or 100 or more electrochemical cells connected in series or in parallel. Each cell comprises the anode and/or the cathode pan assembly described herein, an anode, a cathode, and an ion exchange membrane.

In some embodiments, the electrolyzers provided herein are monopolar electrolyzers. In the monopolar electrolyzers, the electrodes may be connected in parallel where all anodes and all cathodes are connected in parallel. In some embodiments, the electrolyzers provided herein are bipolar electrolyzers. In the bipolar electrolyzers, the electrodes may be connected in series where all anodes and all cathodes are connected in series. In some embodiments, the electrolyzers are a combination of monopolar and bipolar electrolyzers and may be called hybrid electrolyzers.

In some embodiments of the bipolar electrolyzers as described above, the cells are stacked serially constituting the overall electrolyzer and are electrically connected in two ways. In bipolar electrolyzers, a single plate, called bipolar plate, may serve as base plate for both the cathode and anode. The electrolyte solution may be hydraulically connected through common manifolds and collectors internal to the cell stack. The stack may be compressed externally to seal all frames and plates against each other which are typically referred to as a filter press design. In some embodiments, the bipolar electrolyzer may also be designed as a series of cells, individually sealed, and electrically connected through back-to-back contact, typically known as a single element design. The single element design may also be connected in parallel in which case it would be a monopolar electrolyzer.

In some embodiments, the cell size may be denoted by the active area dimensions. In some embodiments, the active area of the electrolyzers used herein may range from 0.5-1.5 meters tall and 0.25-3 meters wide. The individual compartment thicknesses may range from 10 mm-100 mm.

Examples of electrocatalysts have been described herein and include, but not limited to, highly dispersed metals or alloys of the platinum group metals, such as platinum, palladium, ruthenium, rhodium, iridium, or their combinations such as platinum-rhodium, platinum-ruthenium, or nickel mesh coated with $RuO_2$. The electrodes may be coated with electrocatalysts using processes well known in the art.

In some embodiments, the ion exchange membrane is an anion exchange membrane (for alkaline conditions) or a cation exchange membrane (for acidic conditions). In some embodiments, the cation exchange membranes in the electrochemical cell, as disclosed herein, are conventional and are available from, for example, Asahi Kasei of Tokyo, Japan; or from Membrane International of Glen Rock, NJ, or Chemours, in the USA. Examples of CEM include, but are not limited to, N2030WX (Chemours), F8020/F8080, and F6801 (Aciplex). CEMs that are desirable in the methods and systems herein may have minimal resistance loss, greater than 90% selectivity, and high stability. For example only, a fully quaternized amine containing polymer may be used as an AEM.

Examples of cationic exchange membranes include, but not limited to, cationic membrane consisting of a perfluorinated polymer containing anionic groups, for example sulphonic and/or carboxylic groups. However, it may be appreciated that in some embodiments, depending on the need to restrict or allow migration of a specific cation or an anion species between the electrolytes, a cation exchange membrane that is more restrictive and thus allows migration of one species of cations while restricting the migration of another species of cations may be used. Similarly, in some embodiments, depending on the need to restrict or allow migration of a specific anion species between the electrolytes, an anion exchange membrane that is more restrictive and thus allows migration of one species of anions while restricting the migration of another species of anions may be used. Such restrictive cation exchange membranes and anion exchange membranes are commercially available and can be selected by one ordinarily skilled in the art.

In some embodiments, the membranes may be selected such that they can function in an acidic and/or alkaline electrolytic solution as appropriate. Other desirable characteristics of the membranes include high ion selectivity, low ionic resistance, high burst strength, and high stability in electrolytic solution in a temperature range of room temperature to 150° C. or higher.

In some embodiments, a membrane that is stable in the range of 0° C. to 150° C.; 0° C. to 100° C.; 0° C. to 90° C.; or 0° C. to 80° C.; or 0° C. to 70° C.; or 0° C. to 60° C.; or 0° C. to 50° C.; or 0° C. to 40° C., or 0° C. to 30° C., or higher may be used. For other embodiments, it may be useful to utilize an ion-specific ion exchange membranes that allows migration of one type of ion (cation with CEM, anion with AEM) but not another; or migration of one type of anion and not another, to achieve a desired product or products in an electrolyte.

The ohmic resistance of the membranes may affect the voltage drop across the anode and the cathode, e.g., as the ohmic resistance of the membranes increase, the voltage across the anode and cathode may increase, and vice versa. Membranes that can be used include, but are not limited to, membranes with relatively low ohmic resistance and relatively high ionic mobility; and membranes with relatively high hydration characteristics that increase with temperatures, and thus decreasing the ohmic resistance. By selecting membranes with lower ohmic resistance known in the art, the voltage drop across the anode and the cathode at a specified temperature can be lowered.

The voltage may be applied to the electrochemical cell by any means for applying the current across the anode and the cathode of the electrochemical cell. Such means are well known in the art and include, without limitation, devices, such as, electrical power source, fuel cell, device powered by sun light, device powered by wind, and combination thereof. The type of electrical power source to provide the current can be any power source known to one skilled in the art. For example, in some embodiments, the voltage may be applied by connecting the anodes and the cathodes of the cell to an external direct current (DC) power source. The power source can be an alternating current (AC) rectified into DC. The DC power source may have an adjustable voltage and current to apply a requisite amount of the voltage to the electrochemical cell.

Methods

In some aspects, there are provided methods to make, manufacture, and/or use the anode and/or the cathode pan assembly provided herein.

In one aspect, there is provided a method, comprising positioning the manifold inside the anode and/or the cathode pan of the electrochemical cell and fluidly connecting the outlet tube with the manifold thereby forming the anode and/or the cathode pan assembly, wherein cross sectional area of the manifold comprises depth of the manifold to be between about 0.25-0.75 of depth of the anode and/or the cathode pan. The cross sectional area of the manifold in combination with the equivalent diameter of the outlet tube has been provided herein.

In one aspect, there is provided a method, comprising positioning one or more ribs inside an anode and/or a cathode pan of an electrochemical cell wherein the one or more ribs comprise one or more notches; and placing a baffle plate over the one or more ribs wherein the baffle plate comprises two or more slots and fitting the two or more slots over the one or more notches of the one or more ribs.

In one aspect, there is provided a method to form an anode and/or a cathode pan assembly, comprising positioning a manifold inside an anode and/or a cathode pan of an electrochemical cell and fluidly connecting an outlet tube with the manifold, wherein cross sectional area of the manifold comprises depth of the manifold to be between about 0.25-0.75 of depth of the anode and/or the cathode pan; positioning one or more ribs inside the anode and/or the cathode pan of the electrochemical cell wherein the one or more ribs comprise one or more notches; and placing a baffle plate over the one or more ribs wherein the baffle plate comprises two or more slots and fitting the two or more slots over the one or more notches of the one or more ribs.

In some embodiments of the aforementioned aspects, the method further comprises placing the baffle plate perpendicularly to the one or more ribs. In some embodiments of the aforementioned aspects and embodiments, the method further comprises attaching an electrode to top of the one or more ribs and the anode and/or the cathode pan. In some embodiments of the aforementioned aspects and embodiments, the method further comprises suspending the baffle plate between the electrode and the anode and/or the cathode pan. In some embodiments of the aforementioned aspects and embodiments, the method further comprises leaving space between the baffle plate and the top and/or bottom of the anode and/or the cathode pan and/or the manifold for gas and liquid flow.

In some embodiments of the aspects and embodiments provided herein, the manifold, the outlet tube, the ribs, and/or the electrode are metallurgically attached to the anode and/or the cathode pan. In some embodiments of the aspects and embodiments provided herein, the baffle plate is metallurgically attached to the one or more ribs. The "metallurgical" or grammatical equivalent thereof, used herein includes any metallurgical technique to attach an element to the pan and/or the electrochemical cell. Such techniques include, without limitation, diffusion bonding, soldering, welding, cladding, e.g. laser cladding, brazing, and the like.

In some embodiments of the aspects and embodiments provided herein, the method further comprises operating the anode and/or the cathode pan assembly provided herein under a high flow rate of anolyte or catholyte, respectively, of between about 200-10,000 kg/h. The high flow rates of the anolyte and/or catholyte have been provided herein.

In some embodiments of the aspects and embodiments provided herein, the method further comprises positioning the anode and/or the cathode pan assembly provided herein to assemble an electrochemical cell and operating the electrochemical cell at high current densities of between about 300 mA/cm$^2$-6000 mA/cm$^2$. Various rages of the high current densities for operating the electrochemical cell have been provided herein.

In some embodiments of the foregoing aspects and embodiments, the electrochemical cell is hydrogen gas producing cell. The gas flowing through the manifold, the outlet tube, and/or the baffle plate in the anode assembly or the cathode assembly is oxygen gas and hydrogen gas, respectively.

In some embodiments of the foregoing aspects and embodiments, the method further comprises ensuring superficial liquid velocity of anolyte and/or catholyte through the manifold and outlet tube and/or the baffle plate to be less than 0.1 m/s or less than 0.08 m/s or less than 0.05 m/s. In some embodiments of the foregoing aspects and embodiments, the method further comprises accommodating high flow rate of anolyte or catholyte and/or gas preventing slug or plug flow. The high flow rates of the anolyte and/or catholyte through the anode and cathode have been exemplified herein. In some embodiments of the foregoing aspects and embodiments, the method further comprises preventing pressure fluctuations due to multiphase flow in the cell to less than 0.5 psi or less than 0.4 psi or less than 0.3 psi or less than 0.2 psi or less than 0.1 psi. In some embodiments of the foregoing aspects and embodiments, the method further comprises preventing membrane erosion and/or fatigue.

In some embodiments of the foregoing aspects and embodiments, the method further comprises partitioning volume inside the anode and/or the cathode pan with the baffle plate and creating a riser region between the baffle plate and the electrode that is rich in gas and creating a down-comer region between the baffle plate and floor of the pan that is rich in the electrolyte.

In some embodiments of the foregoing aspects and embodiments, the method further comprises enabling an electrolyte circulation and top to bottom mixing with the baffle plate causing thermal equilibration of the inflowing electrolyte and preventing overheating of the cell.

In one aspect, there is provided a process for manufacturing the anode and/or the cathode pan assembly, comprising: attaching the manifold inside the anode and/or the cathode pan of the electrochemical cell and fluidly connecting the outlet tube with the manifold thereby forming the anode and/or the cathode pan assembly, wherein cross sectional area of the manifold comprises depth of the manifold to be between about 0.25-0.75 of depth of the anode and/or the cathode pan. The cross sectional area of the manifold in combination with the equivalent diameter of the outlet tube as well as materials of construction, have been provided herein.

In one aspect, there is provided a process for manufacturing the anode and/or the cathode pan assembly, comprising attaching one or more ribs inside the anode and/or the cathode pan of the electrochemical cell wherein the one or more ribs comprise one or more notches; and placing the baffle plate over the one or more ribs wherein the baffle plate comprises two or more slots and fitting the two or more slots over the one or more notches of the one or more ribs.

In one aspect, there is provided a process for manufacturing the anode and/or the cathode pan assembly, comprising attaching the manifold inside the anode and/or the cathode pan of the electrochemical cell and fluidly connecting the outlet tube with the manifold thereby forming the anode and/or the cathode pan assembly, wherein cross sectional area of the manifold comprises depth of the manifold to be between about 0.25-0.75 of depth of the anode and/or the cathode pan; attaching one or more ribs inside the anode and/or the cathode pan of the electrochemical cell wherein the one or more ribs comprise one or more notches; and placing the baffle plate over the one or more ribs wherein the baffle plate comprises two or more slots and fitting the two or more slots over the one or more notches of the one or more ribs.

In some embodiments of the foregoing aspect, the process comprising metallurgically attaching the manifold inside the anode and/or the cathode pan of the electrochemical cell. In some embodiments of the foregoing aspect, the process comprising metallurgically attaching the one or more ribs inside the anode and/or the cathode pan of the electrochemical cell and metallurgically attaching the baffle plate over the one or more ribs.

In one aspect, there is provided a process for assembling an electrochemical cell, comprising:
assembling an individual electrochemical cell by joining together the anode pan assembly described herein with a conventional cathode assembly comprising a cathode pan and a cathode;
attaching an anode to the anode pan assembly to form an anode assembly;
placing the anode assembly and the cathode assembly in parallel and separating them by an ion-exchange membrane; and
supplying the electrochemical cell with feeders for a cell current and an electrolysis feedstock.

In one aspect, there is provided a process for assembling an electrochemical cell, comprising:
assembling an individual electrochemical cell by joining together the cathode pan assembly described herein with a conventional anode assembly comprising an anode pan and an anode;
attaching a cathode to the cathode pan assembly to form a cathode assembly;

placing the anode assembly and the cathode assembly in parallel and separating them by an ion-exchange membrane; and supplying the electrochemical cell with feeders for a cell current and an electrolysis feedstock.

In one aspect, there is provided a process for assembling an electrochemical cell, comprising:

assembling an individual electrochemical cell by joining together the anode pan assembly described herein and the cathode pan assembly described herein;

attaching an anode to the anode pan assembly to form an anode assembly and attaching a cathode to the cathode pan assembly to form a cathode assembly;

placing the anode assembly and the cathode assembly in parallel and separating them by an ion-exchange membrane; and supplying the electrochemical cell with feeders for a cell current and an electrolysis feedstock.

In some embodiments of the aforementioned aspects, the electrochemical cell is hydrogen gas producing cell. The gas flowing through the manifold, the outlet tube, and/or the baffle plate in the anode assembly or the cathode assembly is oxygen gas and hydrogen gas, respectively.

In one aspect, there is provided a process for assembling an electrolyzer, comprising: assembling aforementioned individual electrochemical cells; and placing a plurality of the assembled electrochemical cells side by side in a stack and bracing them together so as to sustain electrical contact between the electrochemical cells.

The following examples are put forth so as to provide those of ordinary skill in the art with a disclosure and description of how to make and/or use the present invention, and are not intended to limit the scope of what the inventors regard as their invention nor are they intended to represent that the experiments below are all or the only experiments performed. Various modifications of the invention in addition to those described herein will become apparent to those skilled in the art from the foregoing description and accompanying figures. Such modifications fall within the scope of the appended claims. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

In the examples and elsewhere, abbreviations have the following meanings:

| | |
|---|---|
| IEM = | ion exchange membrane |
| kgh = | kilogram per hour |
| mA/cm$^2$ = | milliamps/centimeter square |
| m = | meter |
| mm = | millimeter |
| mm$^2$ = | millimeter square |
| m/s = | meter/sec |
| psi = | per square inch |

EXAMPLES

Example 1

Manifold and Outlet Tube with Large Cross Sectional Area

Table 1 below demonstrates some examples of the high cross sectional areas of the manifold and the outlet tube to accommodate high flow rates, avoid plug and slug flow (ensuring superficial liquid velocity of anolyte and/or catholyte to be less than 0.1 m/s) and prevent pressure fluctuations that can cause the membrane damage. The depth of the manifold is 0.5 the depth of the anode or the cathode pan (providing clearance for flow of the liquid and the gas over the manifold). Table 1 shows exemplary manifold widths, manifold cross sectional area, and outlet tube equivalent diameter for various high flow rates, that provide a liquid superficial velocity of KOH of less than 0.1 m/s through the manifold and the outlet tube.

TABLE 1

| Pan width [mm] | Pan depth [mm] | Manifold depth [mm] | KOH mass flow rate [kg/h] | Superficial liquid velocity through pan [m/s] | Minimum manifold cross-section [mm$^2$] | Equiv. dia. of outlet tube [mm] | Minimum manifold width [mm] |
|---|---|---|---|---|---|---|---|
| 289 | 50 | 25 | 100 | 0.0016 | 231 | 17 | 9 |
| 289 | 50 | 25 | 300 | 0.0048 | 694 | 30 | 28 |
| 289 | 50 | 25 | 500 | 0.0080 | 1157 | 38 | 46 |
| 289 | 50 | 25 | 750 | 0.0120 | 1736 | 47 | 69 |
| 2600 | 50 | 25 | 500 | 0.0009 | 1157 | 38 | 46 |
| 2600 | 50 | 25 | 750 | 0.0013 | 1736 | 47 | 69 |
| 2600 | 50 | 25 | 1000 | 0.0018 | 2315 | 54 | 93 |
| 2600 | 50 | 25 | 2500 | 0.0045 | 5787 | 86 | 231 |
| 2600 | 50 | 25 | 5000 | 0.0089 | 11574 | 121 | 463 |

Example 2

Baffle Plate Configuration

Figure 10:
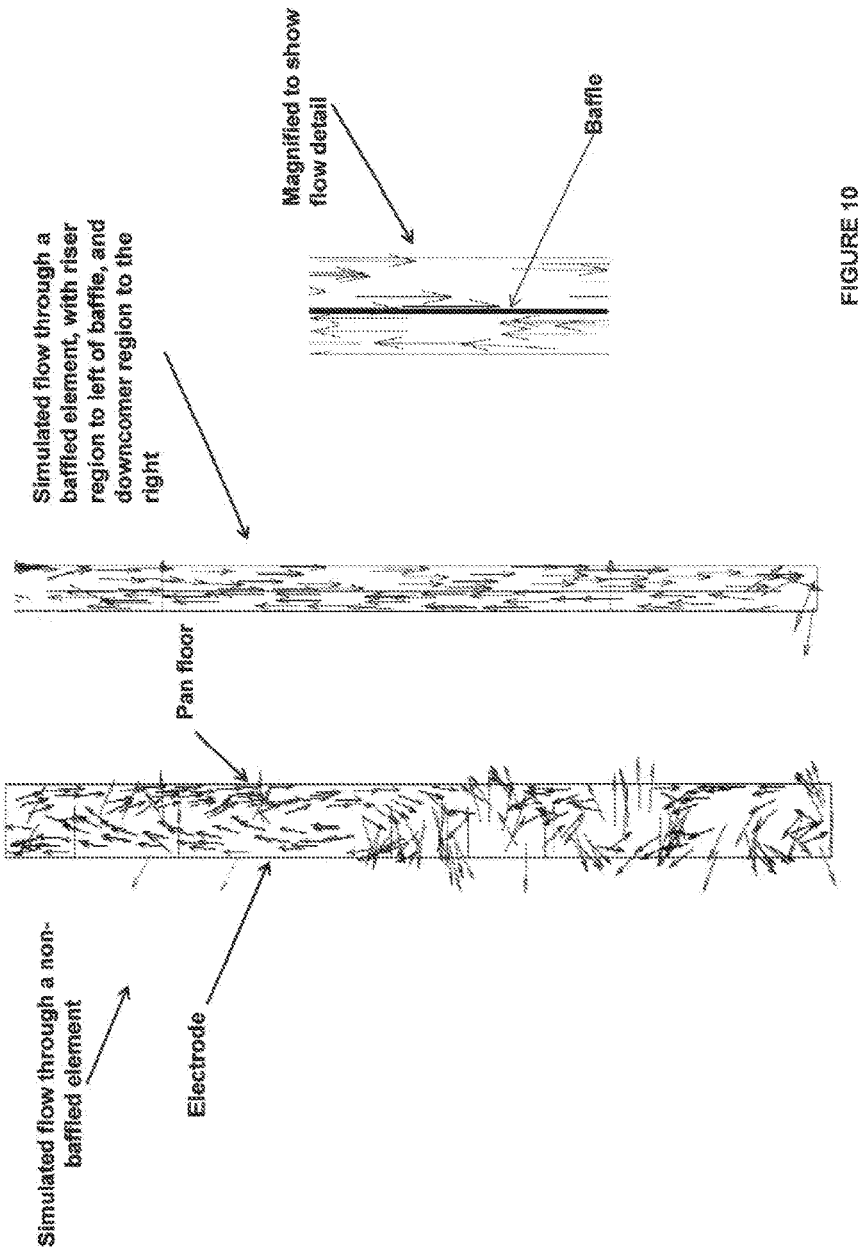
FIG. 10 illustrates vector plots showing simulated liquid flow distribution with and without the baffle plate, as explained in Example 2.

FIG. 10 demonstrates vector plots showing simulated liquid flow distribution with and without the baffle plate. Without the baffle plate (image on the left in FIG. 10), the potassium hydroxide (KOH) solution rises slowly up though the cell. The gas evolved at the electrode (corresponding to the left side of the model) impacts the flow of the KOH dragging some of the liquid up, and buffeting some of the liquid laterally. Gas lift is evident along the upper left wall (adjacent to the electrode) in the left image of FIG. 10.

The inclusion of the baffle plate and its location (image on the right in FIG. 10) creates a strong circulation within the half-shell. As is evident from the image on the right in FIG. 10, the flow on the electrode (up-riser) side of the baffle plate is strongly oriented upward due to gas lift, and the flow on the pan floor (down-comer) side of the baffle plate is strongly oriented downward. The relatively high velocities and shear rates in the up-riser side help sweep gas from the electrode; provide efficient top to bottom mixing; and drive increased convective cooling.

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. An electrode pan assembly, comprising:
an electrode pan having a bottom pan end and a top pan end; and
a baffle plate having a bottom baffle end and a top baffle end,
wherein the baffle plate is disposed in the electrode pan such that a first space is formed between the bottom pan end and the bottom baffle end that is from 6 mm to 75 mm, wherein the first space is sized and positioned to allow a gas and a liquid to flow therethrough,
wherein the baffle plate is disposed in the electrode pan such that a second space is formed between the top pan end and the top baffle end, wherein the second space is sized and positioned to allow the gas and the liquid to flow therethrough, and
wherein the first space and the second space form a portion of a circulation loop for the gas and the liquid to flow.

2. The electrode pan assembly of claim 1, wherein the electrode pan further comprises a manifold, the manifold disposed proximate to the top pan end to direct the gas and the liquid to flow out of the electrode pan assembly.

3. The electrode pan assembly of claim 2, wherein the manifold directs the gas and the liquid to flow out of the electrode pan assembly, and wherein the manifold is sized to provide a space for the gas to collect and the liquid to flow through without masking of an active area of the electrode pan assembly with the gas, or without causing slug and plug flow of the gas or the liquid.

4. The electrode pan assembly of claim 2, wherein the manifold prevents or minimizes formation of stagnant gas pockets adjacent the top pan end.

5. The electrode pan assembly of claim 2, wherein the second space is formed between the manifold and the top baffle end.

6. The electrode pan assembly of claim 2, wherein the manifold has a cross-sectional area of 520 mm$^2$ to 6200 mm$^2$.

7. The electrode pan assembly of claim 2, wherein the electrode pan has a depth and the manifold has a cross-sectional area defined in part by a depth dimension that is from 0.25 to 0.75 of the electrode pan depth.

8. The electrode pan assembly of claim 1, wherein the circulation loop for the gas and the liquid facilitates thermal equilibration and reduced temperature variations in the liquid.

9. The electrode pan assembly of claim 1, wherein the liquid has a flow rate through the electrode pan of from 200 kg/h to 10,000 kg/h.

10. The electrode pan assembly of claim 1, wherein the liquid has a superficial liquid velocity of less than 0.1 m/s in the circulation loop.

11. The electrode pan assembly of claim 1, wherein the first space is between 20 mm and 75 mm.

12. The electrode pan assembly of claim 1, wherein the second space is from 6 mm to 150 mm.

13. The electrode pan assembly of claim 1, wherein the liquid comprises an electrolyte solution.

14. The electrode pan assembly of claim 1, wherein the gas is hydrogen or oxygen.

15. The electrode pan assembly of claim 1, further comprising one or more ribs disposed in the electrode pan, and wherein the baffle plate is coupled to the one or more ribs.

16. The electrode pan assembly of claim 15, wherein the baffle plate is slidably coupled to the one or more ribs within the electrode pan.

17. The electrode pan assembly of claim 16, wherein the one or more ribs comprise one or more notches and the baffle plate comprises one or more slots configured to fit over or into one or more notches of the one or more ribs to provide for the slidable coupling between the baffle plate and the one or more ribs.

18. The electrode pan assembly of claim 1, further comprising a down-corner region disposed between a first side of the baffle plate and a first side of the electrode pan, wherein the gas and the liquid flow from proximate the top pan end toward the bottom pan end; and
a riser region disposed between a second side of the baffle plate and a second side of the electrode pan, wherein the gas and the liquid flow from proximate the bottom end toward the top pan end, wherein the second side of the baffle plate is opposite the first side of the baffle plate and the second side of the electrode pan is opposite the first side of the electrode pan, wherein the first space, the second space, the down-comer region and the riser region form the circulation loop.

19. The electrode pan assembly of claim 18, further comprising an electrode that is parallel or substantially parallel to the baffle plate and that extends between the top pan end and the bottom pan end on the second side of the baffle plate adjacent to the riser region, wherein the electrode pan further comprises a pan floor that is parallel or substantially parallel to the baffle plate and that extends between the top pan end and the bottom pan end on the first side of the baffle plate adjacent to the down-comer region, and wherein the gas and the liquid flowing up the riser region have a fluid velocity that is sufficient to sweep all or substantially all gas that is produced at the electrode away from the electrode while flowing up the riser region.

20. The electrode pan assembly of claim 18, further comprising an electrolyte inlet into the electrode pan proximate to the bottom pan end, wherein the electrolyte inlet is configured to feed fresh liquid into the electrode pan so that the fresh liquid mixes with the gas and the liquid flowing in the recirculation loop to form a mixing zone at least partially within the first space between the bottom pan end and the bottom baffle end.

21. The electrode pan assembly of claim 1, wherein the first space between the bottom pan end and the bottom baffle end is from 30 mm to 65 mm.

22. The electrode pan assembly of claim 1, wherein the first space is configured to provide for mixing between incoming liquid and the circulation loop to enable thermal equilibration of the incoming liquid and the circulation loop.

* * * * *